United States Patent
Madden et al.

(10) Patent No.: US 10,663,358 B2
(45) Date of Patent: May 26, 2020

(54) METHOD AND SENSOR FOR PRESSURE SENSING BASED ON ELECTRICAL SIGNAL GENERATED BY REDISTRIBUTION OF MOBILE IONS IN PIEZOIONIC LAYER

(71) Applicant: The University of British Columbia, Vancouver (CA)

(72) Inventors: John Madden, Vancouver (CA); Mirza Sarwar, Vancouver (CA); Yuta Dobashi, Vancouver (CA); Edmond Cretu, Vancouver (CA); Shahriar Mirabbasi, Vancouver (CA); Ettore Glitz, Vancouver (CA); Meisam Farajollahi, Vancouver (CA)

(73) Assignee: The University of British Columbia, Vancouver (CA)

( * ) Notice: Subject to any disclaimer, the term of this patent is extended or adjusted under 35 U.S.C. 154(b) by 270 days.

(21) Appl. No.: 15/555,961

(22) PCT Filed: Mar. 4, 2016

(86) PCT No.: PCT/CA2016/050238
§ 371 (c)(1),
(2) Date: Sep. 5, 2017

(87) PCT Pub. No.: WO2016/141468
PCT Pub. Date: Sep. 15, 2016

(65) Prior Publication Data
US 2018/0038745 A1 Feb. 8, 2018

Related U.S. Application Data

(60) Provisional application No. 62/129,466, filed on Mar. 6, 2015.

(51) Int. Cl.
*G01L 1/00* (2006.01)
*G01L 11/00* (2006.01)

(52) U.S. Cl.
CPC .............. *G01L 1/005* (2013.01); *G01L 11/00* (2013.01)

(58) Field of Classification Search
CPC .................................. G01L 1/005; G01L 11/00
See application file for complete search history.

(56) References Cited

U.S. PATENT DOCUMENTS

| 6,586,810 | B2 * | 7/2003 | Thakur | .............. G01L 1/005 257/414 |
| 6,809,462 | B2 | 10/2004 | Pelrine et al. | |

(Continued)

FOREIGN PATENT DOCUMENTS

WO     2015048530 A1    4/2015

OTHER PUBLICATIONS

Extended European Search Report dated Sep. 26, 2018 in corresponding EP Patent Application No. 16760965.0.

(Continued)

*Primary Examiner* — Nathaniel T Woodward
(74) *Attorney, Agent, or Firm* — Klarquist Sparkman, LLP

(57) ABSTRACT

A method of sensing a pressure applied to a surface comprises monitoring an electrical signal generated by redistribution of mobile ions in a piezoionic layer under the surface. An externally applied local pressure at a portion of the layer induces redistribution of mobile ions in the piezoionic layer. It is determined that the surface is pressured based on detection of the electrical signal. A piezoionic sensor includes a sensing surface; a piezoionic layer disposed under the sensing surface such that an externally applied local pressure on a portion of the sensing surface causes detectable redistribution of mobile ions in the piezoionic layer; and electrodes in contact with the layer, configured to (Continued)

monitor electrical signal generated by the redistribution of mobile ions in the piezoionic layer.

22 Claims, 23 Drawing Sheets

(56) References Cited

U.S. PATENT DOCUMENTS

| | | |
|---|---|---|
| 2003/0034534 A1 | 2/2003 | Thakur |
| 2006/0144154 A1 | 7/2006 | Ueno et al. |
| 2006/0213275 A1 | 9/2006 | Cobianu et al. |
| 2006/0266642 A1* | 11/2006 | Akle .................. F03G 7/005 204/282 |
| 2009/0301875 A1* | 12/2009 | Wu .................... G01N 27/406 204/400 |

OTHER PUBLICATIONS

Shahinpoor et al., "A New Effect in ionic Polymeric Gels: the Ionic Flexogelectric Effect," Proceedings of the SPIE—The International Society for Optical Engineering, (1995), vol. 2441, pp. 42-53.

Otsuki et al., "Characterization of a curvature sensor using a solid polymer electrolyte," ICMIT 2009: Mechatronics and Information Technology, 2009, pp. 75000L-75000L-8.

Sun et al., "Highly stretchable arid tough hydrogels," Nature, 2012, vol. 489, No. 7414, pp. 133-136.

Keplinger et al., "Stretchable, transparent, ionic conductors," Science, 2013, vol. 341, No. 6149, pp. 984-987.

World Intellectual Property Organization, International Search Report (ISR) dated Jun. 8, 2016 in PCT/CA2016/050238.

World Intellectual Property Organization, Written Opinion (WO) dated Jun. 8, 2016 in PCT/CA2016/050238.

World Intellectual Property Organization, International Preliminary Report on Patentability (IPRP) dated Sep. 12, 2017 in PCT/CA2016/050238.

Noh et al., "Ferroelectret film-based patch-type sensor for continuous blood pressure monitoring," Electron. Lett., 2014, vol. 50(3), pp. 143-144.

Kärki, M. kääriainen, and J. Lekkala, "Measurement of heart sounds with EMFi transducer," in Proc. Int. Conf. Eng. Med. Biol. Soc., Lyon, France, 2007, pp. 1683-1686.

Otsuki, et al., "Characteristic evaluation of a solid polymer electrolyte sensor", Microsyst. Technol., 2011, vol. 17, pp. 1129-1133.

First Office Action dated Jun. 28, 2019 in related CN Patent Application No. 201680013877.1.

* cited by examiner

Two Mobile Ions

One Ion Mobile

METHOD AND SENSOR FOR PRESSURE SENSING BASED ON ELECTRICAL SIGNAL GENERATED BY REDISTRIBUTION OF MOBILE IONS IN PIEZOIONIC LAYER

CROSS REFERENCE TO RELATED APPLICATION

This application claims the benefit of, and priority from, U.S. Provisional Patent Application No. 62/129,466, filed Mar. 6, 2015, the entire contents of which are incorporated herein by reference.

FIELD

The present invention relates generally to sensors and sensing methods, and particularly to sensors and sensing methods based on detection of electrical signals generated by redistribution of mobile ions in a piezoionic layer induced by an externally applied pressure.

BACKGROUND

Pressure sensing, such as touch sensing, has applications in various fields and industries. For example, touch sensors have been used in electronic devices, such as display or input devices and wearable or implantable electronic devices, and have applications in medical or healthcare industries. Touch sensors are tactile sensors and acquire information through physical touch with another object, such as a human finger. Existing touch sensors include capacitive, piezo-resistive, piezoelectric, inductive or opto-electronic sensors. Typically, these touch sensors require additional energy input, such as by way of an electrical signal applied to the sensor, to detect the touch. There is a desire to develop new or improved touch sensors.

SUMMARY

In an aspect of the present disclosure, there is provided a method of sensing a pressure applied to a surface. The method comprises monitoring an electrical signal generated by redistribution of mobile ions in a piezoionic layer under the surface, wherein the redistribution of mobile ions in the piezoionic layer is induced by an externally applied local pressure at a portion of the layer; and determining that the surface is pressured based on detection of the electrical signal. The redistribution of mobile ions in the piezoionic layer may be induced by an externally applied local pressure without application of an external electrical signal to the piezoionic layer. It may be determined that the surface is touched at a location proximate to the portion of the piezoionic layer. The electrical signal may be monitored through at least two electrodes in contact with one side of the piezoionic layer at different locations. The electrical signal generated by redistribution of mobile ions may comprise a voltage or current, or both, between a first one and a second one of the locations, where the first location is proximate to the portion and the second location is spaced away from the first location. The electrodes may comprise at least three electrodes at three different locations. The piezoionic layer may comprise a polymer. The polymer may have an electrically-neutral (uncharged) backbone. The polymer may be a polyurethane. The piezoionic layer may alternatively comprise a polymer having a charged backbone. Suitable polymers may also include polyacrylamide, poly(vinylidenefluoride-hexafluoropropylene) (PVDF-HFP), polar (polyurethane), highly polar poly(ethylene oxide) (PEO), charged poly(ethylene glycol) (PEG) or PEG derivatives, or other polymers capable of hosting electrolytes. The piezoionic layer may comprise a liquid or solid electrolyte for providing the mobile ions. The electrolyte may be an aqueous or organic electrolyte. An ionic liquid may also be employed to provide the electrolyte, or mobile ions. The piezoionic layer may be encapsulated to prevent leakage or evaporation of the electrolyte. The sensor may be a film.

In another aspect of the present disclosure, there is provided a piezoionic sensor. The sensor includes a sensing surface; a piezoionic layer disposed under the sensing surface such that an externally applied local pressure on a portion of the sensing surface causes detectable redistribution of mobile ions in the piezoionic layer; and a plurality of electrodes in contact with the layer and configured to monitor an electrical signal generated by the redistribution of mobile ions in the piezoionic layer. The redistribution of mobile ions in the piezoionic layer may be induced by an externally applied local pressure and detectable without application of an external electrical signal to the piezoionic layer. The electrodes may be in contact with one side of the layer at different locations, which side may be opposite to the sensing surface. The electrodes may be elongated and have a thickness from 4 to 200 µm. The electrodes may comprise at least one column electrode and at least one row electrode. The electrodes may block less than 10% of the sensing surface. The sensor may comprise a processor connected to the electrodes, and the processor may be configured to analyze the electrical signal and determine that the sensing surface is pressured based on detection of the electrical signal. The piezoionic layer may comprise a piezoionic polymer. The piezoionic polymer may be a polyurethane or PVDF-HFP. The piezoionic layer may comprise a liquid or solid electrolyte. The sensor may have a liquid electrolyte and include an encapsulation layer encapsulating the piezoionic layer. The sensor may be a film.

A further aspect of the disclosure relates to a method of forming a sensor as disclosed herein. In this method, a piezoionic layer is connected to a plurality of electrodes for detecting an electrical signal generated by redistribution of mobile ions in the piezoionic layer caused by an external pressure applied to the piezoionic layer. The piezoionic layer may be encapsulated within an insulation material, such as to prevent contamination or leakage of the electrolyte in the layer.

Other aspects, features, and embodiments of the present invention will become apparent to those of ordinary skill in the art upon review of the following description of specific embodiments of the invention in conjunction with the accompanying figures.

BRIEF DESCRIPTION OF THE DRAWINGS

In the figures, which illustrate, by way of example only, embodiments of the present invention.

DETAILED DESCRIPTION

Figure 1:
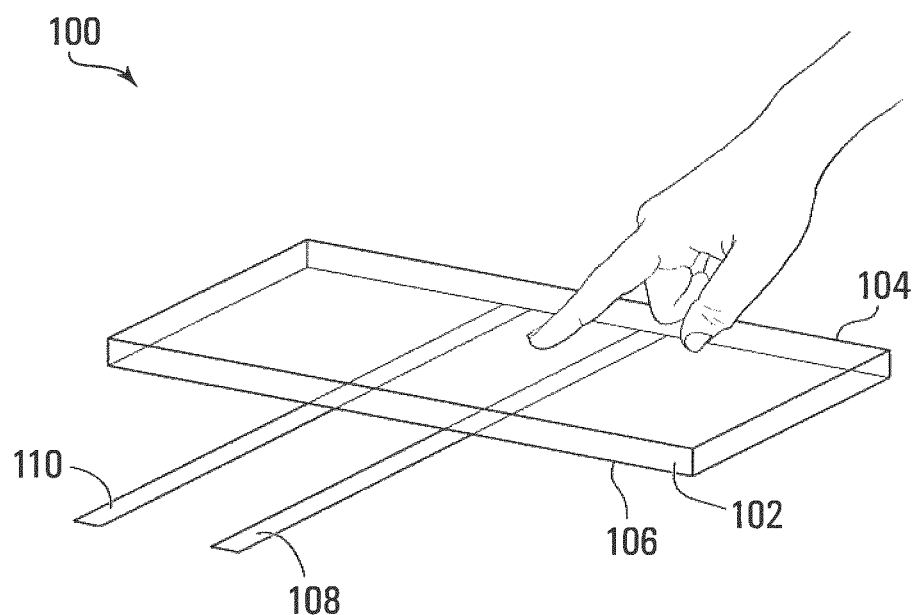
FIG. 1 is a schematic perspective view of a piezoionic touch sensor, illustrative of an embodiment of the present invention.

It has been recognized by the present inventors that, in ionically conductive materials having different types of mobile ions with different mobility, the mobile ions can redistribute within the material when the material is locally stressed by an externally applied pressure, such as a touch, without any external electrical energy or signal being applied to the material. Due to the difference in mobility, the local concentrations of different types of mobile ions can change as a result of the redistribution of mobile ions, which can lead to generation of a detectable electrical signal. In some cases, a single type of mobile ion in an ionically conductive material can also redistribute due to a surface pressure and provide a detectable signal. Such materials are referred to herein as piezoionic materials. It has also been recognized that pressure sensors and load cells can be constructed using such piezoionic materials, which are referred to herein as piezoionic sensors.

It has been confirmed by tests that detectable electrical signals can be generated by an externally applied local pressure on a surface of a piezoionic film, without the application of any external electrical signal to the piezoionic film or an electrode attached to the film.

Without being limited to any particular theory, one of the proposed possible mechanisms for the generation of an electrical signal by an external-pressure-induced stress in a piezoionic material is an effect similar to the Donnan effect (also known as the Gibbs-Donnan effect, or Donnan equilibrium). It is hypothesized that the Donnan-like effect arises from inhomogeneous ion distribution within the material. For example, assuming the ion distribution in a deformable piezoionic polymer is initially at equilibrium and mobile ions are uniformly distributed, it can be expected that the electrochemical potential experienced by all species in the material is equal and the free energy is minimal. When an externally applied pressure or stress causes the polymer matrix (or backbone) to non-homogeneously deform, the resulting deformation can lead to a concentration gradient, as certain regions are compressed relative to others. The concentration gradient leads to net ion flux, and, where ions of one charge are more mobile than the other, the development of a charge gradient, at least temporarily. This produces a potential in a manner similar to the Donnan potential generated across a semi-permeable membrane, for example one that is only permeable to cations.

It has been shown that assuming the chemical potential change induced by a pressure gradient is directly compensated by the change in electrical potential, and either cations or anions in the piezoionic polymer are immobilized onto the polymer backbone, an electrical potential difference or voltage can be expected to persist between the location at or proximate to the local stress and another location spaced away from stress location. If both cationic and anionic species are mobile with a similar mobility, the voltage is expected to approach zero as the changes in Gibbs energy induced by differential pressure on both cations and anions are expected to be the same or very similar. The voltage decay behavior is expected to be dependent on the relative mobilities of the ionic species within the polymer.

It is expected that when different types of mobile ions have different mobilities within the polymer material, the redistribution of mobile ions will result in a detectable electrical signal. The local concentrations of different mobile ions can change at locations remote from the stress location, even when the movement of the mobile ions is limited to within a region that does not reach these remote locations. This is because charge redistribution within a first region can be expected to cause charge redistribution in a neighboring region, thus producing a domino effect.

A possible equation for predicting or estimating the electrical potential due to the difference in local concentrations of, e.g., a cationic species, is $$\Delta E = \frac{RT}{zF} \ln\left(\frac{[i^+]_x}{[i^+]_{x+\Delta x}}\right), \quad (1)$$

where the E is the electrical potential, R is the ideal gas constant, T is the temperature, z is the valence charge of the ion, F is the Faraday's constant, $[i^+]_x$ is the concentration of the ith cationic species in the polymer at location x, and $[i^+]_{x+\Delta x}$ is the concentration of the ith cationic species in the polymer at location $(x+\Delta x)$.

Other effects are also likely to be involved in the generation of potential and current. Mobile ions at or near the location of deformation will experience a differential pressure, and be displaced (or moved), such that the chemical potential change compensates for the pressure applied. In the case of only one ion being mobile, a quasi-permanent electric field is generated (as long as the applied pressure persists). In porous materials and gels there may also be flux of solvent and ions within the matrix that leads to charge separation. For example, an effect known as the electrokinetics effect may be expected in some cases, where an effective charge separation is induced by electrostatic interactions between the backbone charge or polar groups of the polymer and the ionic species, when the solvent flows through the pores. Without being limited to any particular theory, it may be expected that when a fluid carrying mobile charged ions, such as cations, flows away from a depressed portion of the sensor layer within the matrix, there is a local decrease of the cation concentration, while the counter charges (negative charges in the example) in the backbone framework (near the layer surface) remain in position. That is, there is a separation between the mobile ions and the fixed charge groups in the sensing layer caused by fluid flow, which will give rise to an electric potential, referred to as the electrokinetics potential or streaming potential. The electric field generated by such an effect will persist before the charged fluid is allowed to return to regain the equilibrium state, after the depression pressure has been removed.

As the electrical signal (e.g. a voltage or current) is generated by redistribution of mobile ions within the piezoionic material, detection of the applied pressure that causes the redistribution the mobile ions can be achieved by measurement of a voltage or current at different measurement or detection points or locations on the material, without any externally applied electrical force to drive current or charge flow within the material. Conveniently, the detection points (e.g. contact electrodes) can be all on one side of a single piezoionic layer in the sensor. In some embodiments, both the location and the relative magnitude (amount) of the applied pressure may be detected, as will become apparent from the description below.

Conveniently, as it is not necessary to measure the capacitance or resistance of the sensor material, it is not necessary to apply an external electrical signal such as a voltage or current to the piezoionic material in order to detect the redistribution of mobile ions. In comparison, an external electrical signal (voltage or current) is typically required to operate a conventional capacitive or resistive touch sensor.

In embodiments of piezoionic sensors, it is also not necessary to provide contact electrodes on opposite sides or opposite ends of the piezoionic layer, such as both above and below the sensing surface. Conveniently, this allows more flexibility for placement of the electrodes and allows a simple sensor structure, as compared to sensors that require electrodes placed at both ends or on both sides of the sensing layer.

A selected embodiment of a piezoionic touch sensor 100 is illustrated in FIG. 1. Sensor 100 includes a piezoionic layer 102, having a top side 104 and an opposite bottom side 106. For ease of description it is assumed that the sensing surface is the top side 104. Two electrodes 108 and 110 are in contact with bottom side 106.

It should be understood that in different embodiments, the top and bottom sides of the sensor may be reversed, and the sensing surface and the electrodes may be on the same side of the sensor.

Electrodes 108 and 110 can be connected to the inputs of a signal processing circuit or processor (not shown in FIG. 1, but see the circuit shown in FIG. 2 and further discussion below) for processing the electrical signal detected through electrodes 108 and 110.

Piezoionic layer 102 may be formed of any suitable piezoionic material that provides mobile ions that are capable of being displaced within the material as a result of local stress or compression, where different types of mobile ions have different mobility. The piezoionic material should be selected so that the expected external pressure to be detected will generate a detectable electrical potential difference over the distance between electrodes 108 and 110. The piezoionic material may include a suitable polymer or hydrogel material.

The polymer may have an uncharged, or neutral, molecular framework such as a cross-linked network or an uncharged or neutral polymer backbone. For example, a polyurethane polymer gel may be suitable for providing such a framework or backbone. As is known, a polyurethane polymer can be compliant, conformal to surfaces, and transparent. The elastic modulus of a polyurethane polymer gel may be about 10 kPa to about 20 MPa, such as about 100 kPa to about 1 MPa, or 300 kPa.

The polymer may also have a charged or polar molecular framework or backbone.

In some embodiments, poly(vinylidenefluoride-hexafluoropropylene) (PVDF-HFP) may be used as the polymer or hydrogel material.

The mobile ions may be provided by a suitable electrolyte disposed in the piezoionic material.

The electrolyte may be provided in the form of a fluid or a solid. For example, a solution of an alkali salt may be used as the electrolyte. The salt may be a chloride salt or a hexafluorophosphate ($PF_6$) salt. Example alkali salts include NaCl, LiCl, KCl, and $NaPF_6$. Other combinations of elements and components may be selected depending on the particular applications.

The electrolyte may be dissolved in a solvent such as water. Depending on the polymer used for the hydrogel, other solvents including propylene carbonate, acetonitrile and other organic solvents may also be suitable. In some applications, a pure ionic liquid may be used to provide the electrolyte, in which case a solvent is not necessary. A suitable ionic liquid is 1-ethyl-3-methylimidazolium bis(trifluoromethylsulfonyl)imide (EMI TFSI).

In different embodiments, suitable ionic liquids may also include 1-ethyl-3-methylimidazolium tetrafluoroborate ($EMIBF_4$), 1-butyl-3-methylimidazolium hexafluorophosphate ($BMIMPF_6$), 1-ethyl-3-methylimidazolium (EMITf), and 1-butyl-3-methylimidazolium tetrafluoroborate ($BMIMBF_4$).

In some selected embodiments, a suitable fluid medium for providing the electrolytes may include water, a non-aqueous solvent, or an ionic liquid. In other selected embodiments, the electrolyte may also be provided within a solid polymer without any fluid medium. Providing the electrolytes in an aqueous liquid can typically provide a higher ionic conductivity, as compared to other types of media, which in turn provides a better voltage or current response to a touch on the sensing surface.

A potential issue with a liquid-based electrolyte material is that during use, the liquid material could be lost such as through leakage or evaporation, or could be contaminated. A sensor with a wet surface may also be inconvenient in some applications. To avoid or minimize loss of electrolyte, or to provide a dry sensor surface, the piezoionic material in the sensor may be sealed or encapsulated (see further discussion below). The encapsulation material may be any suitable encapsulant material. For example, a polydimethylsiloxane (PDMS) or a poly(styrene-b-isobutylene-b-styrene) (SIBS) may be suitable in some applications. Vapor deposited parylene may also be suitable, for example in situations where there is no solvent that can be evaporated.

There are known piezoionic materials which may be suitable for use in piezoionic layer 102. An example piezoionic material with a liquid electrolyte is disclosed in Shahinpoor et al., "A New Effect in Ionic Polymeric Gels: the Ionic Flexogelectric Effect," *Proceedings of the SPIE—The International Society for Optical Engineering*, (1995), vol. 2441, pp. 42-53 (referred to herein as "Shahinpoor"), the entire contents of which are incorporated by reference herein. Shahinpoor reported that mechanically induced non-homogeneous deformations, particularly bending, of strips of ionic polymeric gels can produce an electric field and associated voltage, and suggested that this effect could allow a designer to robotically control deformations in ionic gels by means of a voltage controller or conversely measure the mechanical deformation of gels by the voltage produced due to such deformations. The gel body may become a deformation sensor. While Shahinpoor did not indicate or predict that applying a local pressure to its material by touching could also generate a detectable electrical signal, based on the test results conducted by the present inventors (see further discussion in the Examples below) it can be expected that the piezoionic material described in Shahinpoor could be suitable for use in some embodiments disclosed herein.

Examples of gel electrolyte materials are disclosed in Otsuki et al., "Characterization of a curvature sensor using a solid polymer electrolyte," ICMIT 2009: Mechatronics and Information Technology, 2009, pp. 75000L-75000L-8, the entire contents of which are incorporated by reference herein.

It should be noted that different types of electrolytes are known in the art.

For example, some electrolytes are referred to as gel electrolytes. Gel electrolytes may refer to liquid electrolytes or salts in a polymer scaffold. Gel electrolytes may also include ionic liquids in a polymer. Gel electrolytes are sometimes referred to as "solid polymer electrolytes," even though the electrolyte material may exist in a liquid or semi-liquid phase.

A true solid electrolyte, which does not contain any liquid, may also be used in some cases. For example, a solid piezoionic material may be formed by dispersing an alkali salt (such as a lithium based salt) in poly(ethylene oxide) (PEO), where the salt is in the solid phase and is not dissolved in any fluid. In this case, the PEO polymer is sufficiently polar and is able to solvate the salt without a liquid solvent.

For selecting a salt to be used as an electrolyte to form mobile ions, the following factors may be considered. If a solvent is used, the salt should be compatible with the solvent. For example, when water is used as the solvent, ionic salts such as NaCl, $NaPF_6$, KCl, or the like may be used. When two or more types of ions are present in the same sensor material, to improve performance the salt may be selected so that the resulting material will contain one type of mobile ion (such as an ion with a relatively small atomic radius) that is much more mobile than another type of ion in the material (such as an relatively bulky counter ion).

In an embodiment where the polymer backbone is charged, the type of ion with a higher mobility should have the same charge as the charge in the polymer backbone. For example, poly(ethylene glycol) dimethylacrylate-methacryloxy ethyltrimethylammonium chloride (PEGDMA-MAETAC) is a positively charged polymer and can promote the motion of positive ions and inhibit the motion of negative ions. Other charged poly(ethylene glycol) PEG or PEG derivatives, such as poly(ethylene glycol) diacrylate (PEGDA)-MAETAC, may also be used. To improve separation of oppositely charged ions in response to a local pressure, a salt such as $NaPF_6$ may be selected, where the $Na^+$ cation is much smaller and more mobile than the bulky $PF_6^-$ anion.

In an embodiment where the polymer backbone is uncharged, the piezoionic response may entirely depend on the mobility difference between the cations and anions due to their different sizes. In this case, the polarity of the more mobile ion may not be important.

For different use and applications, the construction and the composition of a piezoionic sensor may be selected differently.

For example, in an application where a low frequency (even approaching DC) response is desirable, the piezoionic material may include an ionomeric polymer such as Nafion. In this case only one type of ion is mobile in the sensing layer, and when a pressure is applied and maintained (with a step-like pressure profile), the relaxation of the detected signal may be slow. In a different embodiment, a similar effect may be achieved with two types of ions. When the sensing layer contains two types of ions that are mobile, one type of ion may displace (move) faster than the other type of ion, which produces the initial signal. The slow-moving type of ion may eventually displace (move) in response to the applied pressure, which can cause the detected signal to decay. Thus, even with two types of ions with different mobility, a near DC step-type response may still be achieved if one of the two types of ions is very large, relatively immobile, and the other is relatively small in size and can more readily move. For example, a sensing material with such a pair of ions may be formed of lithium bis(trifluoromethane) sulfonamide (LiTFSI) salt in PVDF/HFP.

In an application where the sensor is to be used in a dry environment, it may be desired that a polymer with no liquid or solvent, such as dry poly(ethylene oxide) (PEOP), be used, when prolonged exposure to moderate to low humidity environments is expected during use. This is because, if a solvent is included in the sensor, even with encapsulation, there can be a slow escape of the solvent. Another option is to use an ionic liquid based gel. Some ionic liquids are known to have an extremely low vapour pressure, and therefore loss of such ionic liquids can be insignificant even over a relatively long period of time.

In an application where it is desirable that the sensor device is transparent, the sensor materials or piezoionic materials may be selected such that they are not light absorbing, the material surface is smooth, and the material itself does not cause significant light scattering. Potentially suitable materials that have a combination of these properties include polyurethane gels, polyacrylamide or similar gels, hydrogels, or the like.

In an application where it is desirable that the sensor is stretchable, the sensor materials and piezoionic materials may be selected from materials that have a high degree of stretch-ability such as tough hydrogels, for example, aliginate cross-linked polyacrylamide, or the like.

In different applications, the potential technical requirements for selecting suitable sensor materials may include one or more of high sensitivity (characterized by voltage output/applied pressure), wide frequency response, mechanical toughness/strength, transparency (for flexible screens, or the like). Selection of suitable materials may be assisted by referring to the information provided in Tables I and II.

TABLE I

Typical Backbone/Matrix Materials and Corresponding Properties

| Polymer | Sensitivity | Frequency Response (Hz) | Toughness/ Strength | Transparent | Polarity/ Charge |
| --- | --- | --- | --- | --- | --- |
| Polyurethane | High | 0.01-1,000 | Weak | Yes | Polar |
| Polyacrylamide | High | 0.01-1,000 | Moderate | Yes | Polar |
| PEO | Moderate | 0.01-1,000 | Moderate | Yes | Polar |

TABLE I-continued

Typical Backbone/Matrix Materials and Corresponding Properties

| Polymer | Sensitivity | Frequency Response (Hz) | Toughness/ Strength | Transparent | Polarity/ Charge |
|---|---|---|---|---|---|
| PEG-MAETAC | High | 0-1,000 | Moderate | yes | Charged |
| PVDF-HFP | Moderate | 0.01-1,000 | Weak | Yes | Polar |
| NAFION | Moderate | 0-10,000 | Tough | No | Charged |
| FLEMION | Moderate | 0-10,000 | Tough | No | Charged |

TABLE II

Typical Solvents and Corresponding Properties

| Solvent | Ionic conductivity (S/m) | Stability | Safety |
|---|---|---|---|
| Aqueous | High (1-10) | Prone to evaporation | Can be safe depending on the salt used |
| Organic | Moderate (0.1-1) | Can be more stable than aqueous | Can be safe depending on the salt used |
| Ionic Liquid | Low (<0.1) | Highly stable | Uncharacterized |
| PEO (for, e.g., alkali salt in solid phase) | Very low (<0.001) | Highly stable | Expected to be safe due to low volatility |

The frequency response ranges listed in Table I are expected to be suitable for some typical sensing operations. However, for a different or specific sensing operation or other operations, a detectable signal may be produced in a different frequency range.

Depending on the particular application, a piezoionic material may be selected so that layer 102 is transparent and highly compliant, and, at the same, mechanically strong (tough). In some embodiments, a piezoionic material may be selected so that layer 102 contains two or more types of mobile ions, each type of mobile ion having a different property such as charge, size, or mobility. The benefits of using a material that provides multiple types of mobile ions will become apparent below.

There are known ionically conductive polymer materials that are soft, tough, and transparent, which can be used to form a piezoionic material. For example, piezoionic gels formed of polymers with interpenetrating networks (IPN) may be suitable in some embodiments. Examples of stretchable and tough IPN hydrogels are disclosed in Sun et al., "Highly stretchable and tough hydrogels," Nature, 2012, vol. 489, no. 7414, pp. 133-6, the entire contents of which are incorporated by reference herein. Some examples of stretchable and transparent IPN hydrogels are disclosed in Keplinger et al., "Stretchable, transparent, ionic conductors," Science, 2013, vol. 341, no. 6149, pp. 984-7, the entire contents of which are incorporated by reference herein. Some IPN hydrogels have been shown to survive 20 fold extensions before failure, and are very compliant. Some IPN hydrogels can contain about 90 vol % of water, which conveniently allows mobile ions to travel easily within the gel framework.

In some embodiments, a relatively tough polymer with a charged backbone or matrix, such as an ionomer, may also be used as the piezoionic material if the ionomer contains mobile counterbalancing ions within the matrix. Examples of such materials are NAFION™ and FLEMION™. In some embodiments, cation and anion permeable membranes, in which one ion dominates conduction, are also suitable for use in piezoionic sensors. Potentially suitable cation or anion permeable membranes may include CMI-7000 cation exchange membranes and AMI-7001 anion exchange membranes (both available from Membrane International Inc.), or the like. Situations with single mobile ions enable a relatively constant voltage response to be obtained when a constant pressure is applied, rather than the largely transient signal observed when materials with two mobile ions are employed.

Suitable piezoionic materials may include gels such as hydrogels, ionic polymers, porous polymers, membranes such as cationic membranes or anionic membranes, IPNs, polyethylene oxides, and the like. Cellulose or paper materials may also be used, which can be transparent.

Electrodes 108 and 110 may be formed from any suitable conductive materials, such as metals, or other electronic conductors or ionic conductors. Other materials that are known to be suitable for use as electrodes or conductors may also be used. Suitable metal electrodes include gold wires, platinum wires or stainless steel wires. Copper wires or silver wires can also be employed. The metal material may be formed into thin strips or bands. The shape and dimensions of electrodes 108 and 110 may vary and differ from the shape and relative size shown in FIG. 1. The distance between electrodes 108 and 110 may be selected based on the sensing requirements for the particular application and a number of factors, which can be readily appreciated by those skilled in the art (also see further discussion of some of these factors below).

Electrodes 108, 110 may be formed of the same material or different materials. In some applications, it may be desirable to use transparent touch sensors. For such applications, transparent materials may be used to form electrodes 108, 110. For example, very thin metal mesh may be used to form transparent electrodes. In a selected embodiment, metal electrodes or other electrodes having a thickness of more than 10 or 100 nm, such as up to 4 µm, 10 µm, 15 µm, 25 µm, 200 µm, or even thicker, may be used. The distance between electrodes 108, 110 may be more than 0.05 mm for finger touch applications, such as 5 mm or up to 5 cm in some embodiments. As can be appreciated, when the distance between the electrodes is large, thicker electrodes may be used without substantially reducing transparency. In some embodiments, an array of more than two electrodes may be provided and the array of electrodes may be arranged so that the electrode layer is sufficient transparent such as having a transparency of 95% or higher. In other embodiments, ionically conductive polymer or hydrogels may also be used to form the electrodes.

In different embodiments, the electrode materials may also include silver, aluminum, or other metal nanowires, carbon nanotubes, indium tin oxide (ITO), small diameter metal springs that are stretchable, coiled silver-coated nylon, metal coated nanofibers or tubes, gold wires, platinum wires, silver/silver chloride reference electrodes, conducting polymer, nickel, niobium, niobium nanowires, graphene-based conductors, or similar materials.

Touch sensor 100 may be formed by any suitable process which can include conventional processing techniques for preparing the component materials including piezoionic layer 102 and electrodes 108, 110, and for attaching electrodes 108, 110 to piezoionic layer 102.

Without being limited to any particular theory, it is expected that at the interface between electrodes 108, 110 and piezoionic layer 102, no charged species actually travel across the interface. Rather, it is expected that the charge redistribution and change in the local concentration of mobile ions at the side of piezoionic layer 102 near the interface will mainly induce corresponding charge redistribution (by movement of free electrons) at the electrode side. Thus, by monitoring the amount of charge change at the electrode side near the interface, the redistribution of mobile ions in piezoionic layer 102 and hence touching of surface 104 can be monitored or detected.

Conveniently, monitoring the charge change near the interface does not require a large apparent current through the electrode-piezo-material interface. Thus, electrochemical reactions at the interface may be limited. Nonetheless, it may be convenient in some embodiments that the electrodes are made of a noble metal to further limit possible chemical reactions at the interface such as oxidation of the electrode material. Use of an electrode with a larger surface area such as a carbon paper, activated carbon, nickel foam or metal mesh electrode can increase the charge collected.

However, it is expected that the amount of the charge change in response to the applied pressure may be relatively small and therefore it may be convenient to amplify the detected electrical signal, such as using a charge amplifier (including any suitable charge sensitive amplifier or charge sensitive pre-amplifier).

Figure 2:
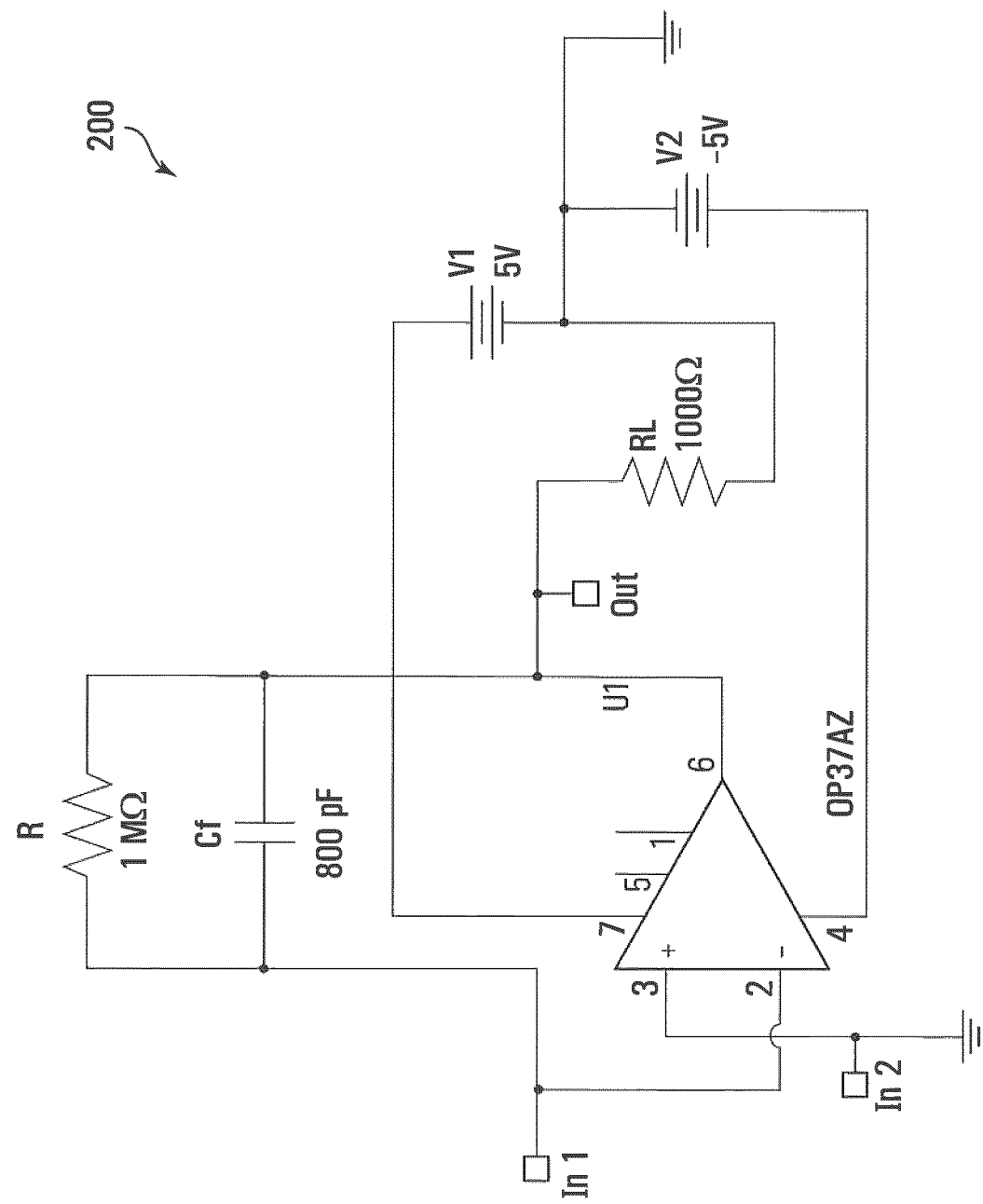
FIG. 2 is a circuit diagram illustrating an example circuit for use with the sensor of FIG. 1.

FIG. 2 illustrates an example amplification circuit 200 for processing electrical signals received from sensor 100 through electrodes 108, 110.

Circuit 200 includes input/output terminals In 1, In 2 and Out, resistors R (1 MΩ) and RL (1 kΩ), a capacitor Cf (800 pF), batteries forming voltage sources V1 (5V) and V2 (−5V), and an operational amplifier OP-AMP, which are inter-connected as shown in FIG. 2. As depicted, the amplifier may be an OP37AZ amplifier. As can be appreciated, the OP37AZ amplifier may be replaced with another suitable operational amplifier. The positive input terminal In 2 is grounded. A negative feedback is provided through capacitor Cf, and resistor R is provided mainly to reduce input bias current build-up effects. RL is a load resistor at the output terminal Out. V1 and V2 are direct current (DC) power sources providing the required operating voltages and electrical power. Circuit 200 may be a standalone circuit connected to another signal processing circuit, or be an integrated component of a readout circuit. For example, a processor may be provided for processing the detected or amplified signals, and the processor may be an integrated-circuit (IC) processor.

To detect redistribution of the mobile ions caused by touch of sensor 100, a charge amplifier such as circuit 200 may be used to amplify the electrical signal generated by a touch in sensor 100 for further processing. For ease of description, it is assumed for this illustration that sensor 100 can be considered as a charge source or voltage source.

In use, electrodes 108, 110 are connected to terminals In 1 and In 2 respectively. As depicted, terminal In 2 is grounded.

When a finger touches top surface 104 of sensor 100 such as at a location proximate to electrode 108 (as indicated by the human finger in FIG. 1), one type of mobile ion, for example cations, are more concentrated around the compressed portion under the touch location, and another type of mobile ion, for example mobile anions, are more concentrated at locations away from the touch location, such as at the location of electrode 110. This redistribution of mobile anions can be detected by monitoring an electrical signal through electrodes 108, 110 because the re-distribution of the ionic charges generates a potential difference between electrodes 108, 110, or a corresponding charge change in electrodes 108, 110 as discussed above, which can be monitored and measured at terminals In 1 and In 2. The electrical signal can be amplified according to a conventional signal amplification technique, such as using circuit 200. The amplified signal may be transmitted to a further processor or a signal reader (not shown) through terminal Out. As can be appreciated, resistors R and RL provide a current path connecting terminal In 1 to the ground for discharging possible charges that may accumulate at terminal In 1, which provides an input to the OP-AMP.

As can be appreciated from FIGS. 1 and 2, no external (non-zero) voltage or electrical signal is applied to sensor 100 through terminals In 1 and In 2 as they are grounded when there is no electrical signal generated internally in sensor 100 between electrodes 108, 110 due to redistribution of the mobile ions. That is, no energy input into the sensor is required to displace the mobile ions and to detect their redistribution.

Figure 3A:
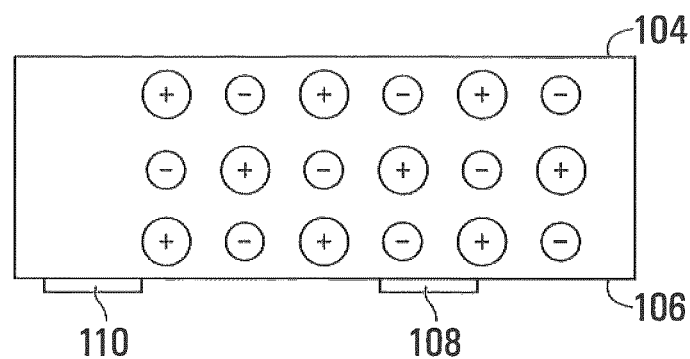
FIGS. 3A and 3B are hypothetical schematic cross-sectional views of the sensor of FIG. 1 during use.
Figure 3B:
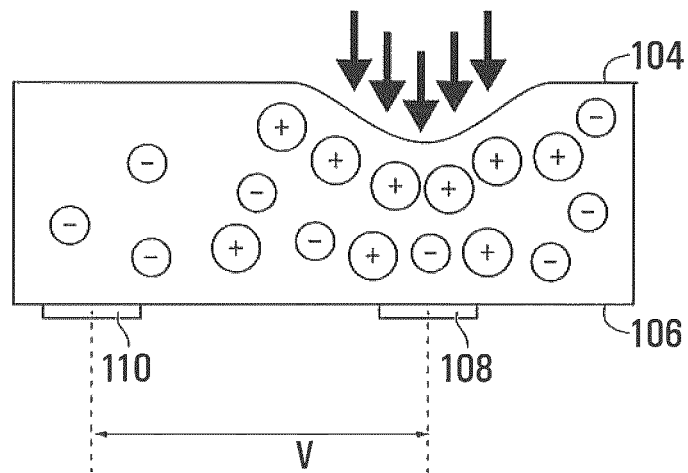

For illustration purposes only, the expected movements and distribution of the ions before and during a touch are schematically illustrated in FIG. 3A and FIG. 3B. It should be understood that the depiction in the figures is hypothetical and does not represent actual movement or distribution of the ions in practice.

As shown in FIG. 3A, it can be expected that before the sensing surface of top side 104 is touched, or otherwise depressed or disturbed, the ions in the region above and proximate to electrode 108 are evenly distributed and balanced. The potential difference between electrodes 108 and 110 is zero or minimal. When the sensing surface is touched and depressed as shown in FIG. 3B, the changes in the material framework/backbone cause a charge re-distribution. It is assumed for illustration purposes that in this example the cations in the material are less mobile and largely remain in the region near the touch location, and more anions are displaced away from the region above electrode 108. It is possible that some cations will also eventually move away, but their movement is assumed to be slower than that of the anions in this example. It is possible that an individual mobile ion will not travel the full distance between the electrodes but it is assumed that the collective movement of the mobile ions caused by the touch will result in redistribution of ionic charges and detectable changes of ionic charge concentrations at regions above or proximate to electrodes 108 and 110. As can be appreciated, the mobility of different ions may depend on a number of factors such as charge polarity, ion size, concentration, solvation sphere, backbone structure and charge property, and other factors. For example, in a polar solvent such as water, the solvent molecule is electrostatically attracted to both the cation and the anion of the salt, resulting in a solvation shell/sphere surrounding the ion. This makes the ion effectively larger in diameter and hence less mobile due to increased drag. Thus, it is possible to select the piezoionic material with a suitable combination of the backbone or gel material and the electrolyte material to provide mobile ions with different mobility. The selective displacement of mobile ions and charge redistribution generates a non-zero potential difference between electrodes 108 and 110, which can be detected as an electrical signal using a readout circuit (not shown in FIG. 3A, 3B). The electrical signal may be first amplified using, e.g., circuit 200.

For example, the amplified electrical signal may be passed through a high pass filter (not shown) to remove drifts in the signal. Depending on the gain of the amplifier, the output voltage of the amplified signal may be in the range of a few hundred mV. This filtered signal can be fed to an analog-to-digital converter (not shown). The converter and the sensor may be integrated on a single device. The converted signal can be analyzed to determine when there is a pressure or touch applied to the sensing surface. For example, a spike in voltage could indicate a tap on the sensing surface. The direction of the voltage change detected at different locations could be used to determine the location of the tap.

The detection of a tap at multiple locations along a given direction may be achieved with two electrodes, but such an arrangement may have some limitations. For example, the range of the piezoionic effect can be limited to a few centimeters in some cases due to rapid attenuation of the 'tap' signal pulse during propagation, and this can consequently limit the distance between the two electrodes. When a tap is very close to one of the two electrodes, the amplitude of the detected signal may be high and the polarity of the signal will change depending on which electrode is closer to the location of the tap. When the tap is at or near the middle of the two electrodes, the amplitude of the detected signal may be low or at a minimum. Thus, by analyzing the signals amplitude and polarity, the location of the tap may be determined. In some embodiments, a threshold may be established for determining a touch. For example, assuming the potential difference in the electrode could change on the order of a few mVs, and the gain of the amplifier is 100, the threshold voltage may be set at about 100 to 200 mV. If there is a rapid change of the output signal by more than about 100 or 200 mV, it can be determined that the sensing surface has been tapped. Within a range (e.g. before the maximum strain is reached and the sensor material is compressed to its elastic limit), the amount of charge displaced is expected to be proportional to the magnitude of the applied pressure (or tap). A lighter tap will result in a smaller strain, hence a smaller amount of charge redistribution and a smaller signal. In comparison, a stronger tap will produce a larger strain and compression of the sensor material, thus giving rise to a larger detectable electrical signal.

In a selected embodiment, a piezoionic touch sensor with a piezoionic layer that contains a liquid electrolyte material and is encapsulated is provided. FIGS. 4A to 4D illustrate a selected process for forming such a sensor 400.

Figure 4A:
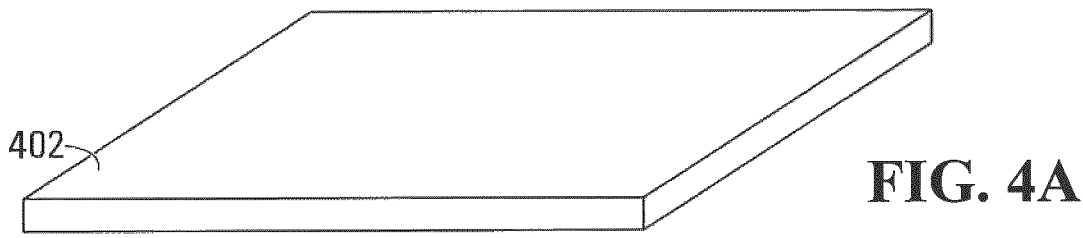
FIGS. 4A, 4B, 4C, and 4D are schematic perspective views for a process for forming a piezoionic sensor with an encapsulated piezoionic layer, illustrative of embodiments of the present invention.

As depicted in FIG. 4A, a substrate 402 with desired dimensions and formed from a PDMS material is provided.

Figure 4B:
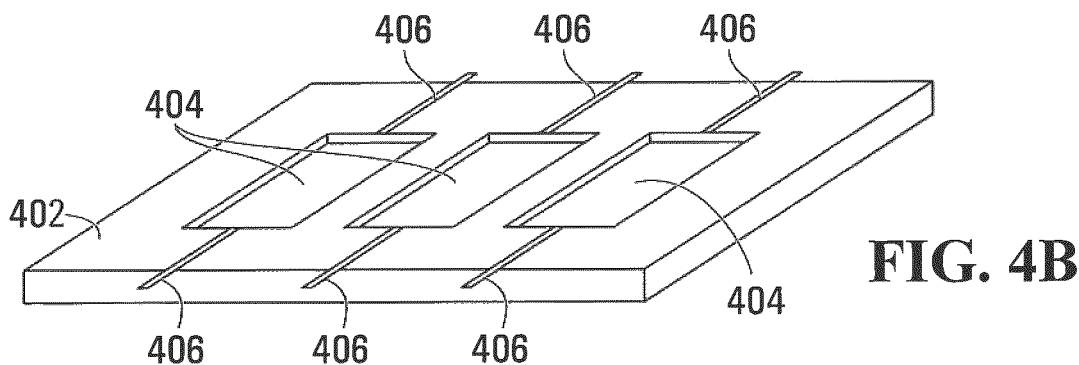

As depicted in FIG. 4B, three suitable cavities 404 are formed on the top side of substrate 402, and electrodes 406 formed from electrically conducting thin metal strips are bonded to the top side of substrate 402. Each electrode 406 extends from a side edge of a cavity 404 towards and beyond an edge of substrate 402. Two electrodes 406 are provided for each cavity 404 at its opposite ends respectively.

Figure 4C:
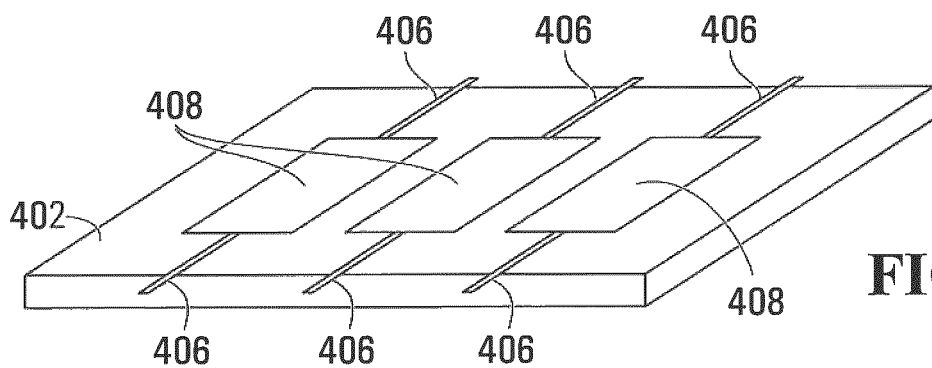

As depicted in FIG. 4C, sensing pads 408 formed of a piezoionic material with dimensions matching the dimensions of cavities 404 are embedded in substrate 400 at respective cavities 404. As the sizes of sensing pads 408 correspond to the sizes of cavities 404, the resulting top surface is smooth. In some embodiments, sensing pads 408 may be bonded to substrate 402 with a suitable bonding technique such as a bonding material. In some embodiments, sensing pads 408 may be snuggly fit into cavities 404, so that sensing pads 408 frictionally engage substrate 402 and a bonding material may not be necessary. As will be discussed further below, electrodes 406 can be used to connect sensing pads 408 to a readout circuit.

Figure 4D:
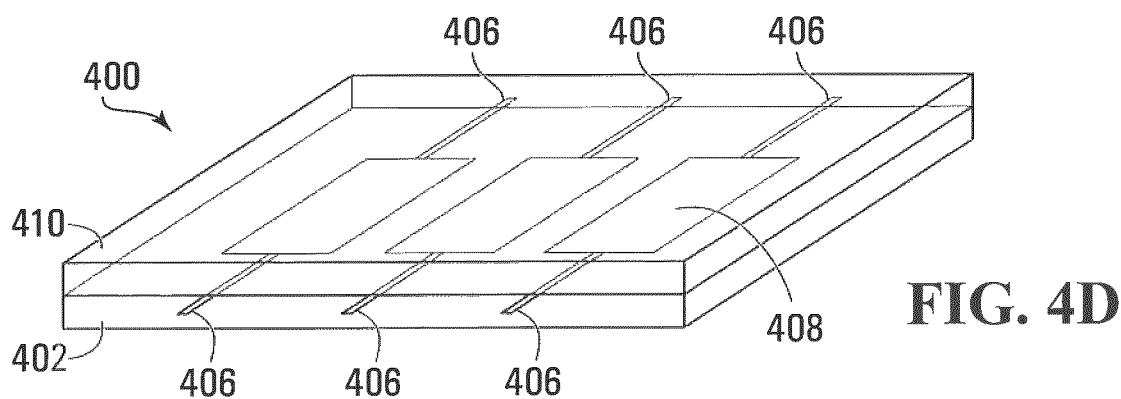

As depicted in FIG. 4D, a top cover layer 410 is bonded with substrate 402 to encapsulate sensing pads 408 and forming sensor 400. Top cover layer 410 may be formed of PDMS, or another suitable insulation material.

The bonding between different layers may be effected by any suitable bonding technique. An example bonding technique is plasma ionization. Optionally, the bonded layers may be treated to coat a thin layer of a poly(p-xylylene) polymer thereon by chemical vapor deposition to form a moisture and dielectric barrier for enhanced encapsulation. For example, the coating may be formed by a Parylene™ polymer.

When sensing pads 408 are embedded in cavities 404 of substrate 402, the top (sensing surface) of sensor 400 can be smooth and have a homogeneous morphology. However, in some embodiments, sensing pads may be placed on a flat top of substrate 402 without cavities, and the resulting sensor may not have a smooth top surface.

While not shown in FIG. 4, a groove in fluid communication with each sensing pad 408 may be provided in layer 402 to store an electrolyte for each sensing pad 408. After the grooves are filled with the electrolyte and covered by top layer 410, the grooves may serve as reservoirs for feeding the electrolyte to sensing pads 408.

Figure 5:
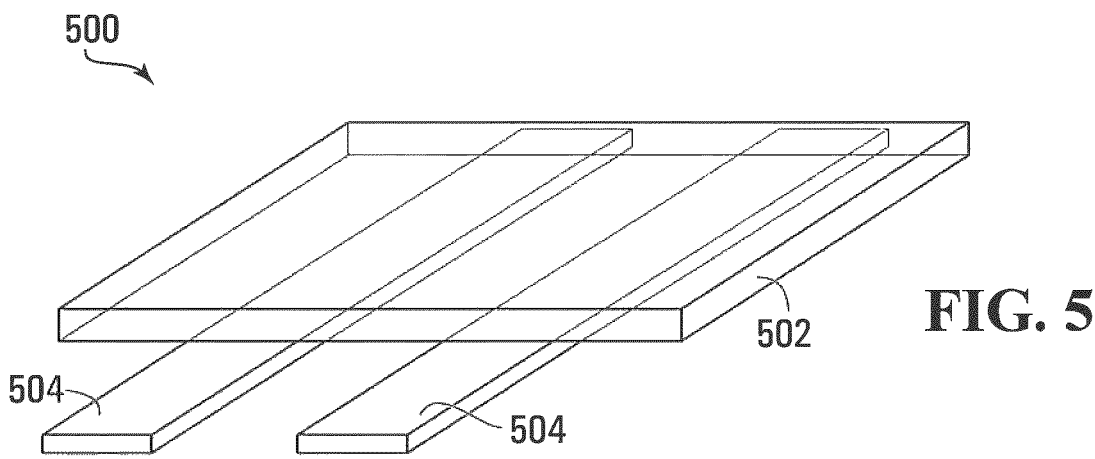
FIGS. 5, 6, 7, 8, 9, 10, 11, 12, 13, 14, 15, and 16 are schematic perspective views of different piezoionic touch sensors, illustrative of selected embodiments of the present invention.

FIG. 5 shows an example piezoionic touch sensor 500, which is similar to sensor 100, except that the piezoionic layer 502 and the electrodes 504 are all formed of the same material, an ionically conducting hydrogel. The body of sensor 500 can be entirely transparent. Electrodes 504 may be connected to a readout-circuit.

Figure 6:
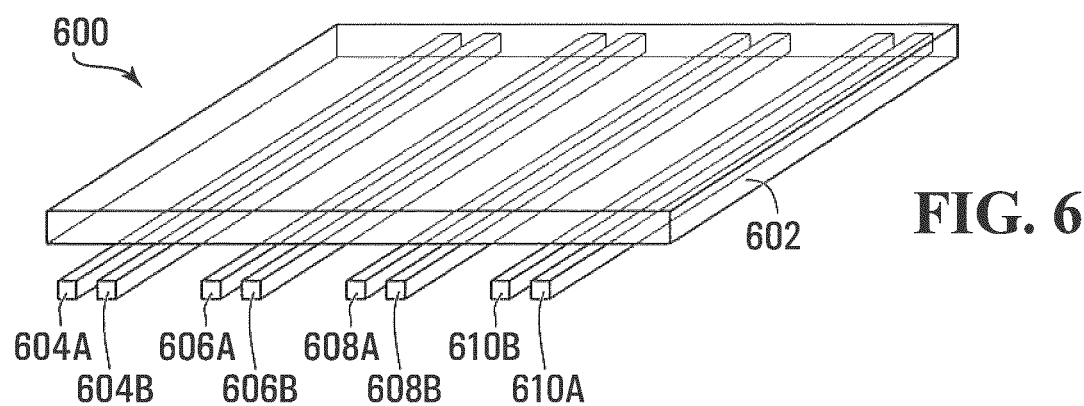

FIG. 6 illustrates a piezoionic touch sensor 600 with paired electrodes. Sensor 600 includes a piezoionic sheet 602 and a plurality of paired electrodes 604A, 604B, 606A, 606B, 608A, 608B, 610A, 610B bonded to the side of sheet 602 that is opposite to the sensing surface. The electrodes are spaced such that each pair of electrodes are closer to each other than to electrodes of adjacent pairs. The distance between each pair of electrodes may be about 2 to about 10 mm for finger touch sense applications, and the distance between the adjacent pairs may be about 20 mm or higher. The electrodes may have a rectangular cross-sectional shape with 10 μm thickness and 20 μm width. Sheet 602 may be formed of a hydrogel soaked with a suitable salt solution.

While sensor 100 and 500 may be useful for detecting tapping within a small region, sensor 600 may be used to detect taps along an extended length in a given direction (or one dimensional space). Each pair of electrodes, such as electrodes 604A, 604B, can be connected to a readout circuit (not shown in FIG. 6) as discussed above to detect a tap at the corresponding location. Depending on which pair of electrodes returned a response signal, it is possible to detect the location of the tap.

Figure 7:
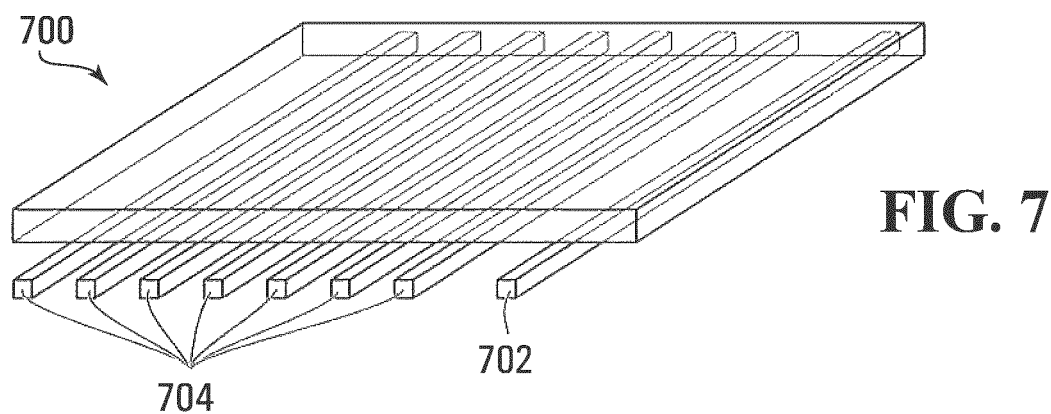

FIG. 7 shows a piezoionic touch sensor 700 with a reference electrode. Sensor 700 is similar to sensor 600 but the electrodes in sensor 700 are arranged differently. Specifically, a reference electrode 702 and a number of sensing electrodes 704 are provided. Sensing electrodes 704 are not paired but are all uniformly spaced apart. Electrodes 704 may be metal electrodes with 10 μm width or thickness, but the width and thickness of the electrodes may vary depending on the particular application, such as in the range from micrometers to centimeters. The distance between adjacent sensing electrodes 704 may be in the range of about 3 mm or higher for finger touch detection. For detection of touch by other objects, for example a stylus, the resolution may be adjusted accordingly. For example, to detect pressures applied with a stylus the spacing between the electrodes may be around 50 μm. If the sensor is used as a floor sensor to detect pressures applied by, e.g. a foot, the spacing between the electrodes may be about 1 cm.

During use, an electrical signal (voltage, current, or charge, or combination thereof) at each sensing electrode 704 is measured against the common reference electrode 702. When an area of the sensing surface proximate to a particular sensing electrode 704 is touched, the voltage between the particular sensing electrode 704 and the reference electrode 702 will change, indicating that the tap is at or near this particular location.

As an example of the working of the sensor, a tap near the leftmost electrode 704 will give rise to a maximum difference in difference in ion concentration near the leftmost electrode 704 and the reference electrode 702. There will be differences in ion concentration between the other electrodes and the reference 702, however they will be smaller in magnitude compared to the difference with the leftmost electrode under these circumstances. This is true for the other electrodes in the array 704.

Figure 8:
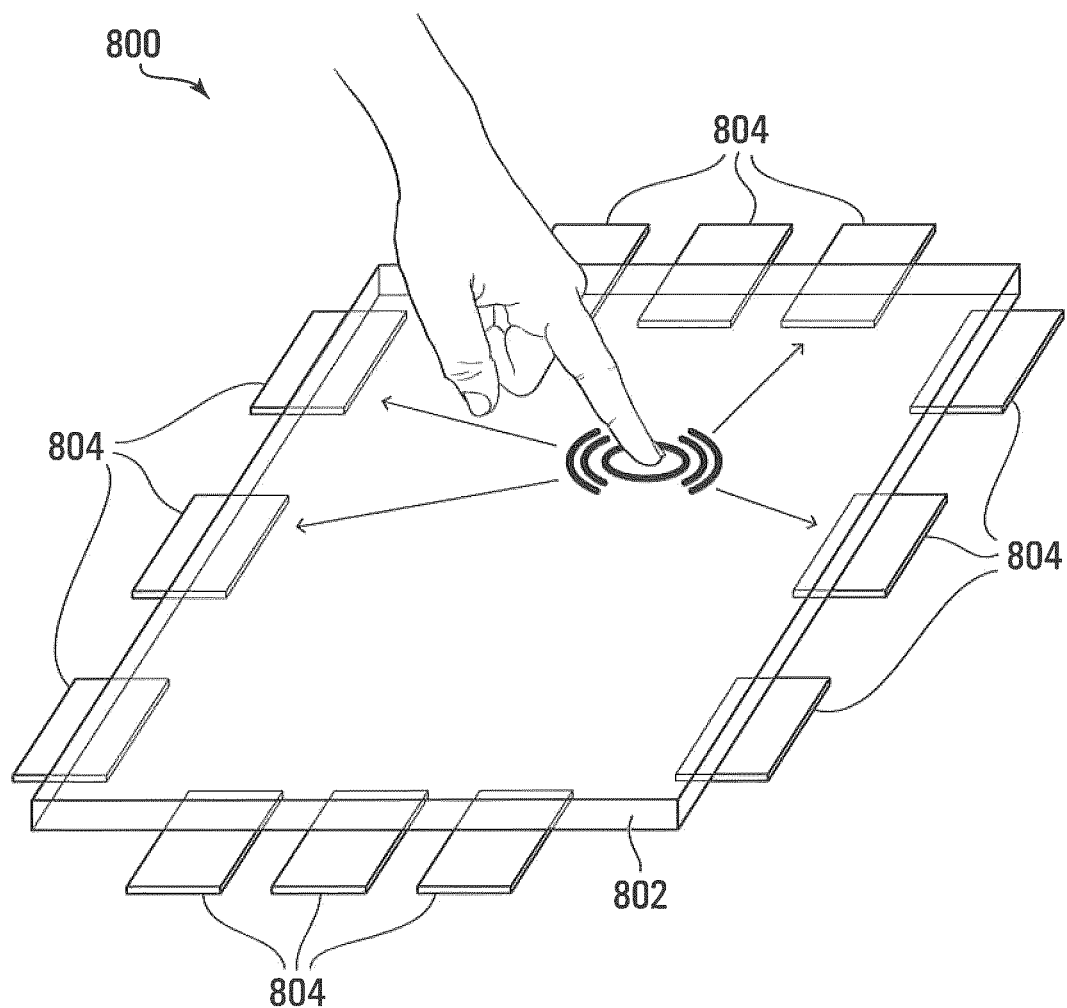

FIG. 8 shows a piezoionic touch sensor 800 with edge electrodes. Sensor 800 includes a piezoionic layer 802, which is similar to piezoionic layer 102, and a plurality of electrode pads 804 attached to each edge on one side (the bottom side as depicted) of layer 802.

During use, each electrode pad 804 is connected to a readout circuit (not shown in FIG. 8). When a region on the sensing surface is touched by a tap, mobile ions are redistributed in piezoionic layer 802 and the effect of the redistribution spreads from the location of the touch with time. As the distances from the location of touch to the different electrode pads 804 are different, the times at which the effect is detected at different electrode pads 804 are different. Thus, the location of the tap may be determined based on the different timing of detecting voltage changes at different electrode pads 804.

It is also possible, by using a suitable signal processing technique, to separately identify two taps occurring at the same time but at different locations, as the detected signals may be considered a superposition of the separate signals.

It is also possible to use the sequence of voltage or current changes with time, along with the magnitude of the signal change, to determine relative position of the tap between two electrodes. A tap at or near one electrode may produce an initial signal of a given polarity, while a tap at or near another electrode may produce another signal with an opposite polarity. The magnitude of the signal may be used to provide distance information. The magnitude of the signal is also dependent on the magnitude of the tap (or the amount of the pressure applied). This information may be used to build a pressure sensitive device that may be able to differentiate between taps ranging from a weak tap to a strong tap.

Figure 9:
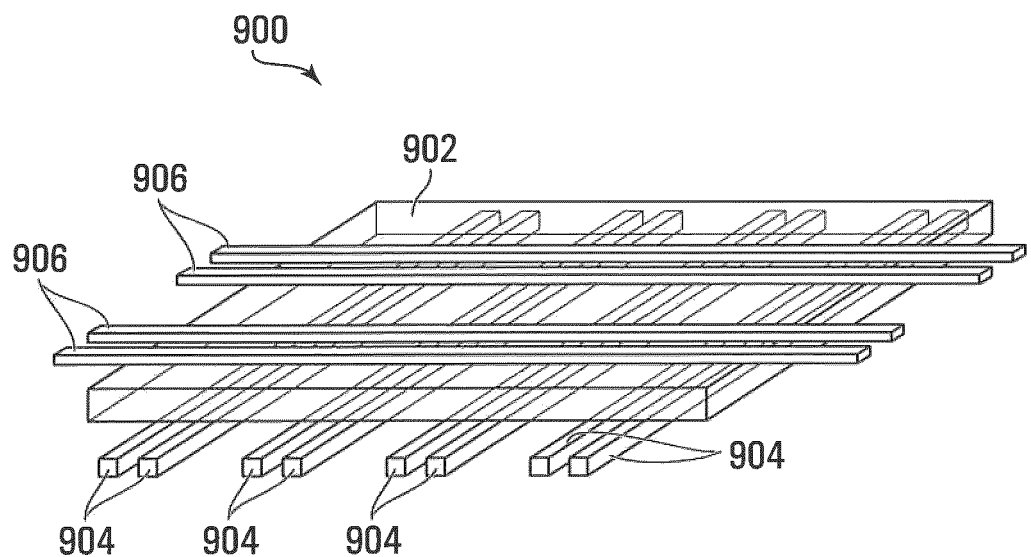

FIG. 9 shows a two-dimensional piezoionic touch sensor 900 that is capable of detecting the location of a touch in two dimensions. The base piezoionic layer 902 is similar to piezoionic layer 102. An array of column electrodes 904 are attached to the bottom side of piezoionic layer 902 and an array of row electrodes 906 are attached to the top side of piezoionic layer 902. Electrodes on the same side of piezoionic layer 902 are paired, similar to the paired electrodes in sensor 600.

During use, when a region between a particular pair of electrodes, e.g. two paired column electrodes 904 and two paired row electrodes 906, is touched, an electrical signal is generated between each of these two pairs of electrodes. Thus, both the column location and the row location of the touch region can be determined. In some embodiments, a signal may also be detectable in nearby electrode pairs, but the location may still be determined based on the magnitude of the signals or the pattern of the signal distribution. In theory, if a tap is applied to the mid-point between the two electrodes in a pair of electrodes, and the pressure is applied symmetrically, the tap may not be detectable in this arrangement. If a pressure is uniformly applied over a large area covering all the electrodes, the applied pressure may also not be detectable in this arrangement. However, in practice such events are unlikely and measures can be taken to avoid such events given the likely pressures to be applied. Row electrodes 906 may be used to detect the touch location in the horizontal direction and column electrodes 904 may be used to detect the touch location in the vertical direction, as depicted in FIG. 9.

In this embodiment, electrodes 904 and 906 may be selected or made sufficiently thin so that sensor 900 is still sufficiently transparent, and the electrodes will not prevent depression of the piezoionic layer 902 by the touch.

Figure 10:
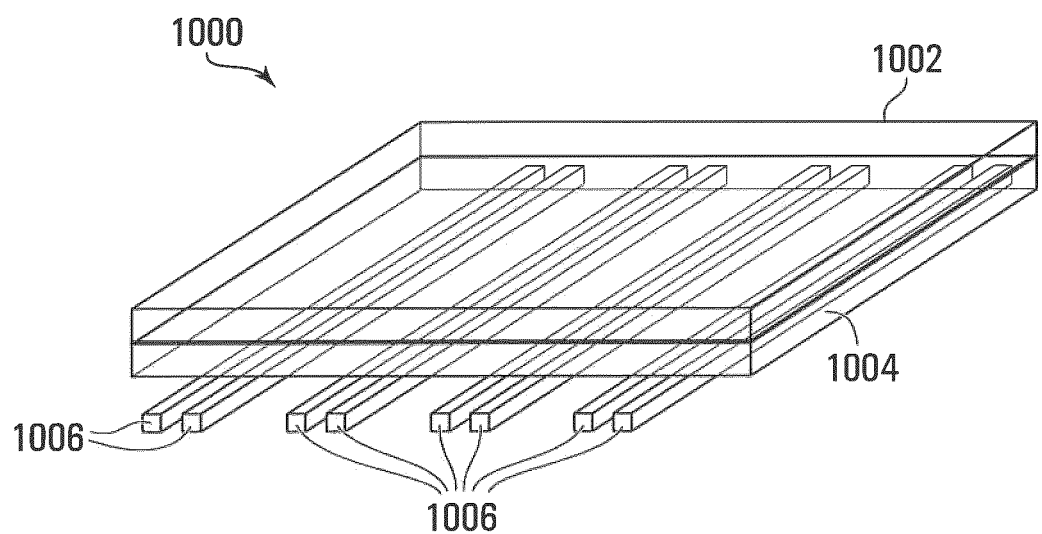

FIG. 10 depicts a piezoionic touch sensor 1000 configured to detect redistribution of mobile ions by capacitive response in the electrodes. Piezoionic touch sensor 1000 includes a piezoionic layer 1002, which is similar to piezoionic layer 102. The bottom side of piezoionic layer 1002 is attached to and covered by a flexible and transparent dielectric layer 1004. An array of paired electrodes 1006 are attached to the bottom side of dielectric layer 1004. Electrodes 1006 are made of a transparent ionically conductive polymer and are paired.

During use, a touch on the top sensing surface of sensor 1000 causes displacement and redistribution of mobile ions in layer 1002. The redistribution of mobile ions can cause electrical charge redistribution in electrodes 1006 near the region in which the ionic charges are changing. Thus, the redistribution of mobile ions in layer 1002 can be capacitively sensed, through dielectric layer 1004, by paired electrodes 1006. Specifically, the charge redistribution in the layer 1002 can induce corresponding charge redistribution in the respective electrodes 1006. This newly distributed charge can produce an electrical field coupling between the electrodes. Such a coupling is similar to the electric field in a capacitor, and the coupling effect can reflect and represent the charge redistribution of the electrodes in 1002. This coupling may be detected using a readout circuit typically used for capacitive sensors.

Sensor 1000 can be entirely transparent and flexible.

Figure 11:
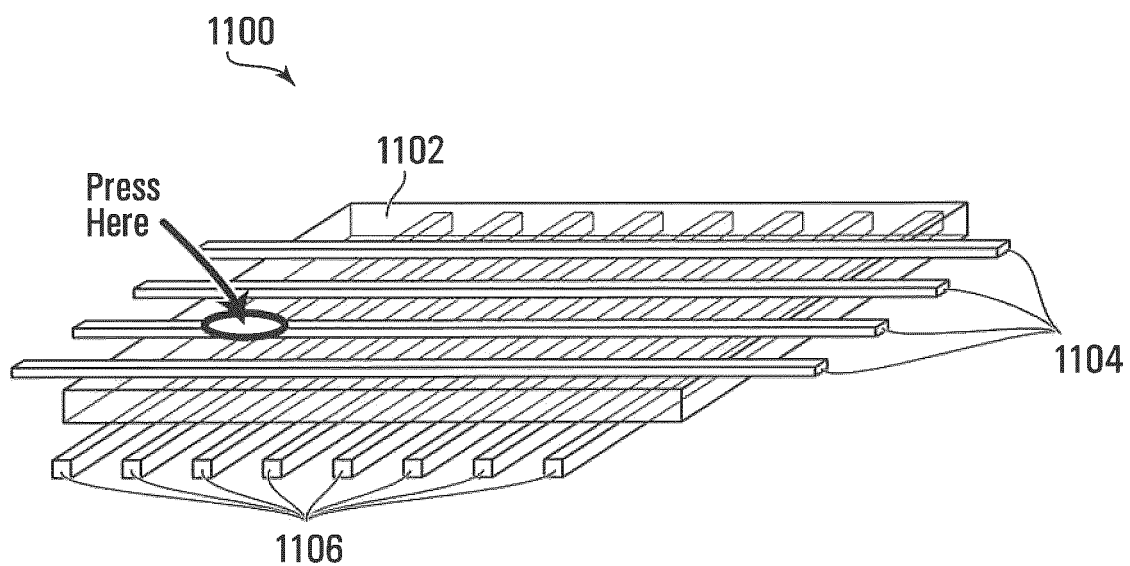

FIG. 11 shows another two dimensional piezoionic touch sensor 1100 with unpaired electrodes.

Sensor 1100 includes a piezoionic layer 1102, which is similar to piezoionic layer 102. An array of row electrodes 1104 are attached to the top side of piezoionic layer 1102 and an array of column electrodes 1106 are attached to the bottom side of piezoionic layer 1102. Unlike in sensor 900, the electrodes on the same side of piezoionic layer 1102 are not paired. A reference electrode is also not necessary in sensor 1100. Rather, electrodes on each side of piezoionic layer 1102 are uniformly spaced.

Piezoionic layer 1102 and electrodes 1104, 1106 are all substantially transparent. As a result, the entire body of sensor 1100 is transparent.

During use, the voltage between each top electrode 1104 and each bottom electrode 1106 is monitored without applying any external electrical signal such as voltage. When sensor 1100 is touched at a location that is proximate to a particular top electrode 1104 and a particular bottom electrode 1106 (e.g. the top and bottom electrodes under the circular region depicted in FIG. 11), the voltage between these two particular electrodes is expected to be larger than the voltages between other pairs of top and bottom electrodes.

Figure 12:
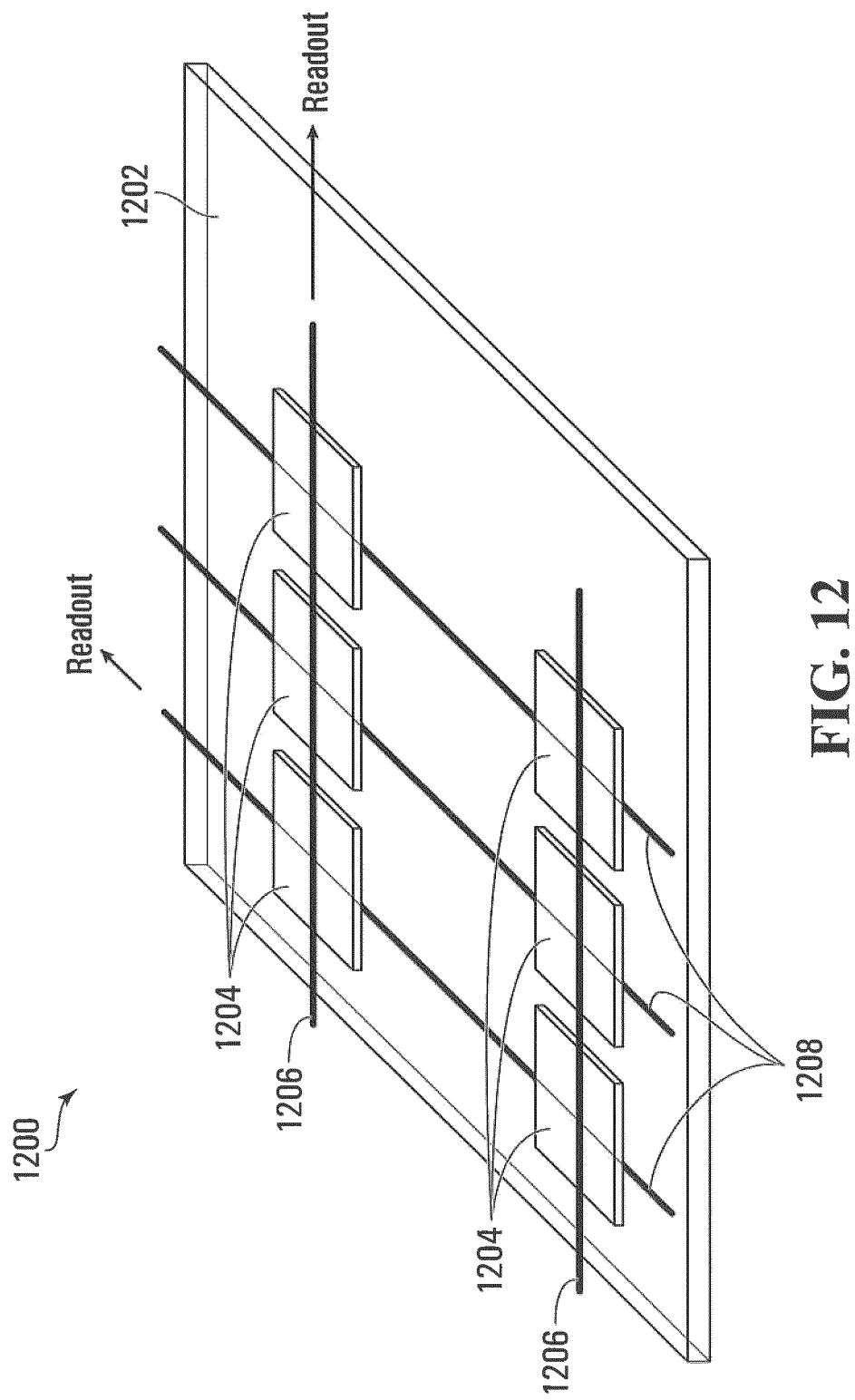

FIG. 12 illustrates a piezoionic touch sensor 1200 with a matrix of sensing pads 1204. Sensor 1200 includes a flexible and transparent substrate 1202, which may be formed of any suitable non-conductive material. Piezoionic pads 1204 are disposed on or embedded in substrate 1202, for example as described above with reference to sensor 400. Piezoionic pads 1204 are arranged in a matrix for convenient identification of their location, and are electrically isolated to avoid "cross-talk" between different pads 1204. Row electrodes 1206 are provided and attached to the top side of pads 1204. Column electrodes 1208 are provided and attached to the bottom side of pads 1204. Electrodes 1206 and 1208 are connected to monitor redistribution of mobile ions in each pad 1204.

The voltage between each pair of row and column electrodes is expected to indicate the redistribution of mobile ions along the thickness direction of the piezoionic pad between the two electrodes when the pad is pressed by a touch.

While square pads are depicted in FIG. 12, as can be appreciated, the shapes and sizes of the piezoionic sensing pads may vary and may be selected based on the requirements of the particular application. The number of pads and their arrangements may also be varied in different embodiments.

Alternatively, the signals at different sensing locations can be detected and analyzed separately as illustrated below in FIGS. 13 and 14.

Figure 13:
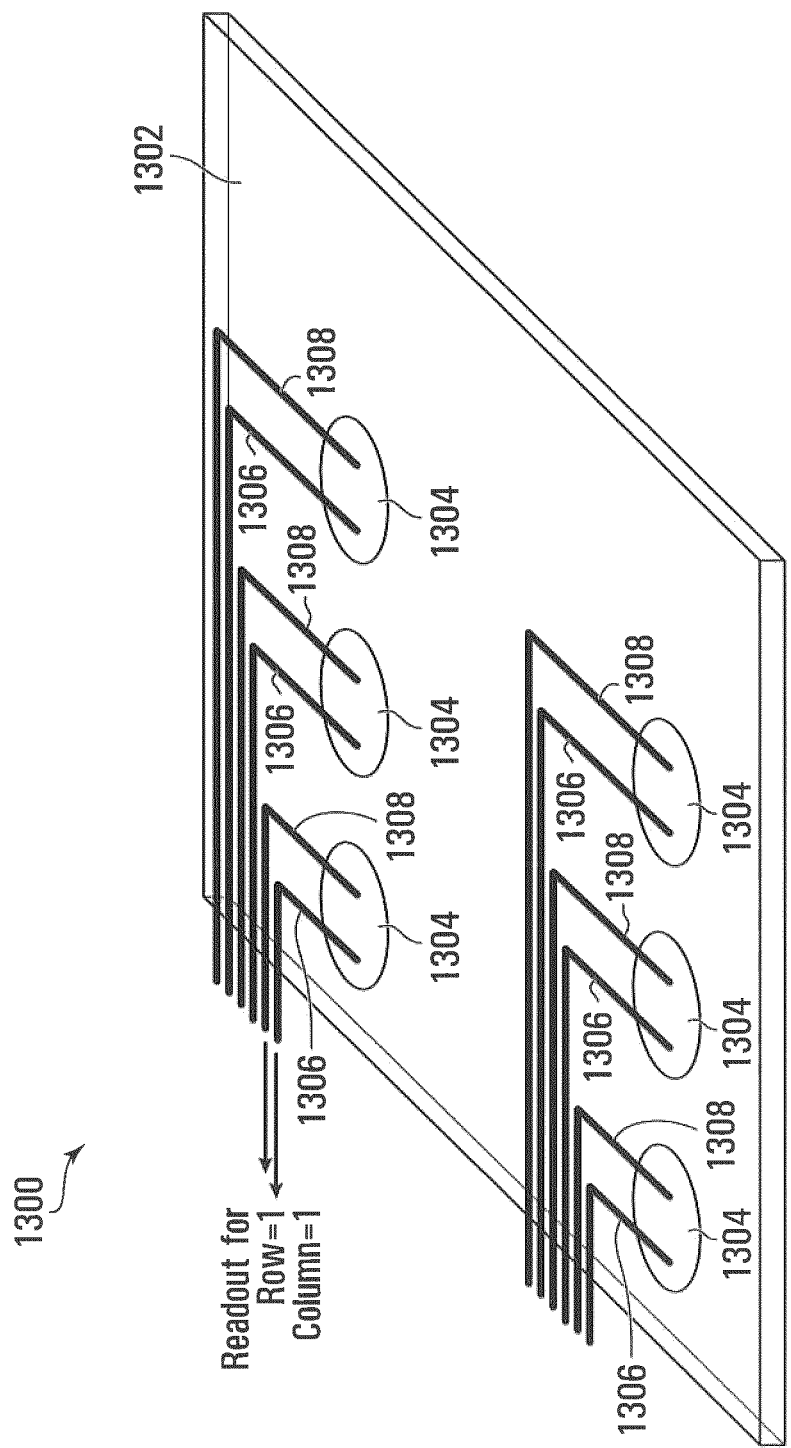

FIG. 13 shows a two-dimensional piezoionic touch sensor 1300. Sensor 1300 includes a piezoionic layer 1302, which is similar to piezoionic layer 102. Circles 1304 in FIG. 13 do not represent any physical material but are used to indicate the proximate individual regions monitored by each pair of electrodes 1306 and 1308 in contact with the particular region 1304. Regions 1304 may be arranged and identified in rows and columns, or in non-rectangular configurations. The signals at each pair of electrodes 1306 and 1308 may be read-out in sequence or monitored simultaneously.

Figure 14:
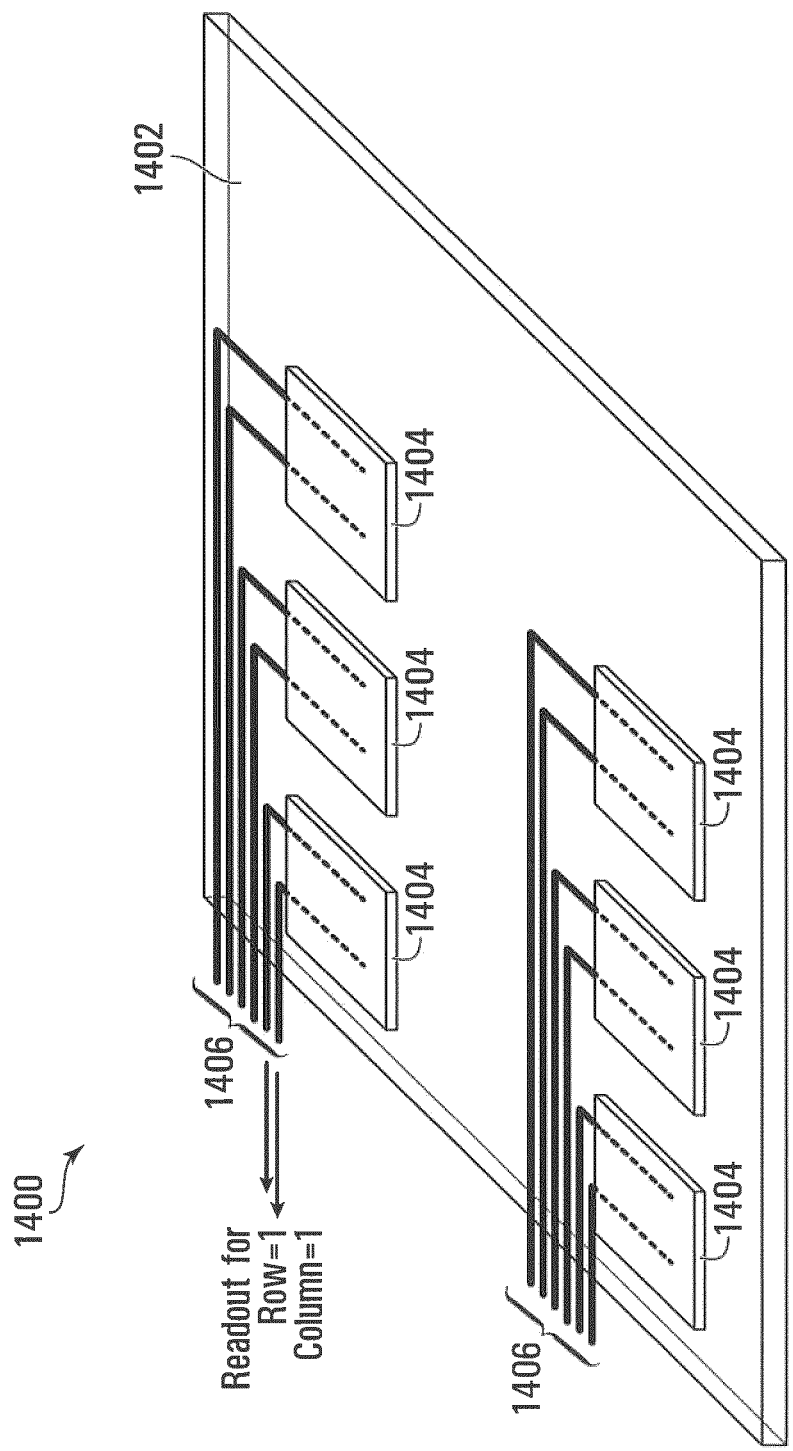

FIG. 14 shows a two-dimensional piezoionic touch sensor 1400. Sensor 1400 includes a flexible and transparent substrate 1402, which may be formed of any suitable non-conductive material. Piezoionic pads 1404 are disposed on or embedded in substrate 1402, for example as described above with reference to sensors 400 and 1200. Piezoionic pads 1404 are arranged in a matrix for convenient identification of their location, and are electrically isolated to avoid "cross-talk" between different pads 1404. A pair of electrodes 1406 are provided and attached to the top or bottom side of each pad 1404. Each pad 1404 thus can function as a sensor 100 as described above. The signals received at each pair of electrodes 1406 are processed separately to monitor voltage, current, or charge from redistribution of mobile ions in the corresponding pad 1404. Each pad 1404 and its corresponding electrodes 1406 can be considered as a separate sensing cell or sensing unit. As a result, interference between different sensing cells (pads) can be avoided or minimized.

Pads 1404 may be placed inside a suitable fitting groove in substrate 1402 to provide a smooth and flat top surface for sensor 1400, which may be desirable for achieving certain optical properties. The materials for different components in sensor 1400 may be selected so that the optical index of each material matches that of other materials, which may help to reduce or avoid optical differences between the different materials, such as the piezoionic material and a surrounding filler material.

Figure 15:
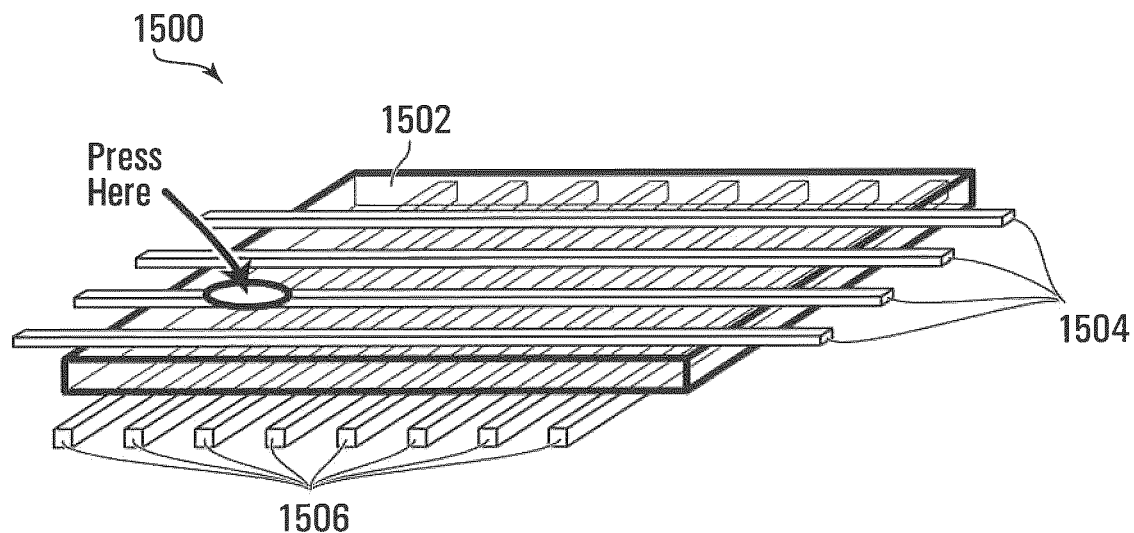

FIG. 15 shows a piezoionic touch sensor 1500. Sensor 1500 includes an insulating, flexible and transparent substrate 1502, a plurality of row electrodes 1504 disposed above substrate 1502 and a plurality of column electrodes 1506 disposed below substrate 1502. Electrodes 1504 and 1506 are formed of an ionically conducting polymer. The electrical signal can be generated between a particular row electrode 1504 and a particular column electrode 1506 when the sensor is pressed at the cross location of the two particular electrodes, and can be detected by a readout circuit (not shown) connected to the electrodes. Conveniently, the entire sensor 1500 may be formed of transparent materials and cross-talk can be avoided.

Figure 16:
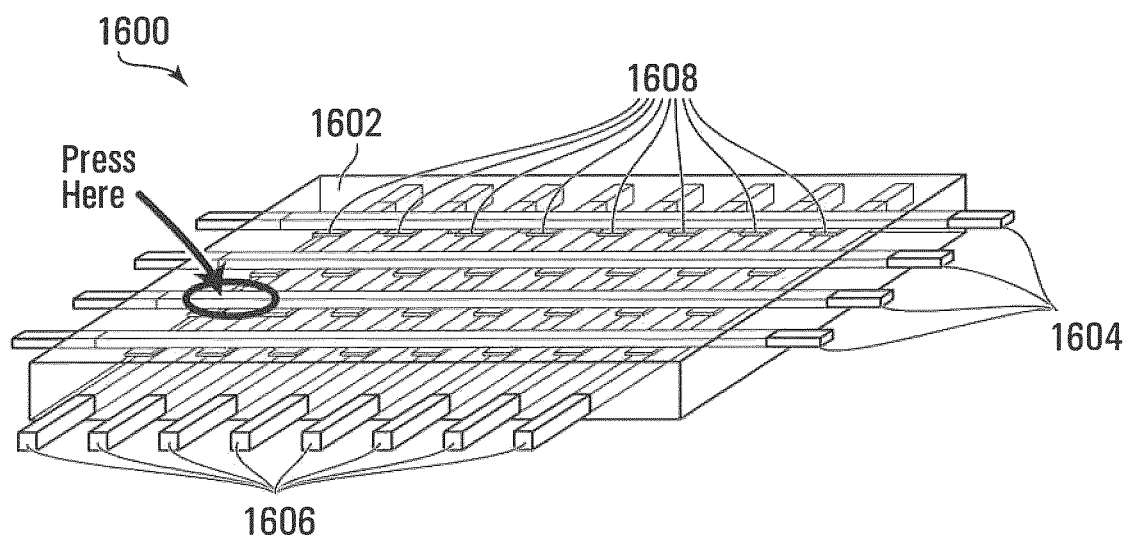

FIG. 16 shows a two-dimensional piezoionic touch sensor 1600 similar to sensor 900 except that both row and column electrodes in sensor 1600 are attached to one side of sensor 1600, and are insulated from one another.

In particular, a piezoionic layer 1602 is provided which is similar to piezoionic layer 902 or 102. An array of row electrodes 1604 and an array of column electrodes 1606 are attached to the top or bottom side of piezoionic layer 1602. Insulation materials, such as insulation pads 1608 as depicted, are provided at cross points of row electrodes 1604 and column electrodes 1606 to insulate the different electrodes.

During use, when a region on the top surface of sensor 1600 proximate to a particular pair of row electrodes 1604 and a particular pair of column electrodes 1606 is touched, an electrical signal responsive to redistribution of mobile ions caused by the touch is generated between each of these two pairs of electrodes. Thus, the row and column locations of the touch can be determined. However, it may be expected that the signal generated by a tap in this case is relatively small.

As now can be appreciated, although embodiments of the sensors disclosed here are illustrated with reference to touch sensors above, other embodiments of different pressure sensors may be constructed based on detection of voltage, current, or charge based upon redistribution of mobile ions in piezoionic materials. For example, a sensor disclosed herein may be used as the sensing element in an accelerometer. In this case, the sensor material is placed in contact with a mass, or connected to the mass through an intermediate object, such that acceleration of the mass will produce a pressure on the sensor material. As the mass is accelerated, a stress is created in the piezoionic sensor material (compressive or tensile), which can induce a sensor response thus enabling detection of the acceleration of the mass. Load cells and other force or displacement related measurements can also benefit from the use of the piezoionic materials combined with electrodes.

Conveniently, embodiments of the pressure sensors described herein can be operated without an externally applied electrical force to drive movement of the mobile ions, and thus an external electrical signal is not necessary and the pressure sensor can function as a passive sensor.

When selecting the materials and constructions of pressure sensors such as touch sensors, a number of factors may be considered. For example, depending on the application, desirable features and properties of touch sensors may include structurally conformal, transparent, low in power consumption, and inexpensive to manufacture and operate. A touch sensor may also be used as a part of electronic skin for robots, and in biomedical, wearable, aerospace or other applications.

Depending on the application, a piezoionic material suitable for an embodiment of the present disclosure may be selected from candidate materials based on one or more of the following considerations.

The candidate material should be ionically conductive. To this end, there should be at least one mobile ion within the candidate material. A mobile ion refers to an ion that is capable of translating relatively freely within the candidate material. Translation or movement of the ion may be, for example, by diffusion under the influence of an applied potential, or in response to an applied pressure. Ionic conductivity in a candidate material may typically be above $10^{-5}$ S/m or higher. For many applications, the ionic conductivity of a suitable piezoionic material may be more than 10 S/m.

The candidate material should be relatively electronically insulating, i.e., it does not have any significant electronic conductivity as compared to the ionic conductivity. Generally, a desirable piezoionic material would have no other mobile charge carriers (e.g. electrons, holes, or bipolarons, except mobile ions). In practice, the concentration of these other mobile charge carriers may not be zero but should be reduced within practical limitations so that they will not materially affect the operation of the sensor, and any electronic conductivity in the piezoionic material should be substantially less than the ionic conductivity.

For use in transparent tactile sensors, the candidate material should be transparent, and may be colorless. For example, the candidate materials may have higher than 90% transparency.

In some applications, such as for use in wearable devices, the candidate materials may be bendable, compliant (e.g. having an elastic modulus less than 10 MPa, such as about 0.1 MPa), and tough with a high elongation at break (fracture strain) such as larger than 100%.

Hydrogels are a class of crosslinked polymers characterized by their extended ability to store water within the bulk due to their hydrophilic groups, many of which are biocompatible. Examples of hydrogel materials include polyurethane, polyacrylamide, collagen, polysaccharide, gelatin, agrose, chitosan, poly-lactic acid and the like. These materials are often biocompatible, and may be suitable for use in different fields from three-dimensional (3D) mesenchymal stem cell scaffolds for tissue engineering to artificial nerve conduits. These materials have historically been explored for use in vivo. They may also be benign for use on a skin surface. Sensors made of such materials may be used, for example, in artificial skin or medical devices that conform to skin surface, and may be used in the form of an adhesive patch or band.

It may now be appreciated that for preparing piezoionic sensors, the electrolytes may be selected so that different types of mobile ions are provided in the sensor where the different ions have different sizes and mobility. In some embodiments, it may be desirable to select a piezoionic material that has multiple types of mobile ions with different mobility. In this regard, the piezoionic material may be selected taking into account of the following factors. A porous framework or backbone structure can allow movement and displacement mobile ions. A porous material with larger, interconnected pores can allow the mobile ions to move through the material more easily. However, a densely packed framework that nevertheless allows ions to diffuse within it can also be an effective piezoionic sensor, though currents may be lower. The electrolyte should provide at least one type of mobile ions that are more mobile than another type of ions of the opposite charge or polarity. Diffusion coefficients of mobile ions in porous water containing materials are generally between $10^{-9}$ and $10^{-11}$ m$^2$/s, and may be $10^{-12}$ to $10^{-14}$ m$^2$/s or lower in dense polymers. As is known, "diffusion coefficient" is also referred to as diffusivity, which is the proportionality constant between the flux of a substance due to diffusion and the concentration gradient of the species, as used in the Fick's law. Aside from mobile ions, the piezoionic material should be electrically non-conductive as otherwise the effect of ion redistribution can be masked by electronic rearrangement. The mechanical properties such as strength of the piezoionic material should be suitable for the particular application. Where a soft and compliant surface interaction is desired, an elastic modulus in the range of 0.1 to 10 MPa may be employed, while for a stiffer and potentially faster recovering material, a modulus of up to several GPa would be common. High elongation at break and toughness is needed in applications where stretching is needed, such as in wearable arm bands or in some clothing. Elongation at break should ideally be in excess of 10% for such applications. Where use with display technologies is desired, for example as a touch sensitive surface coating, transparency in excess of 90% is often expected.

When a transparent sensor is desired, a non-transparent conductive material such as a metal material may be used as the electrodes. However, in such cases the sizes of the electrodes may be selected such that the electrodes block less than 10% of the sensing surface so that the sensor is substantially transparent. In some cases, the electrodes may block less than 50% of the sensing surface. For clarity, it is noted that blocking refers to optically blocking visible light, but in at least some cases, a touch in an area on the surface blocked by an electrode may still be sensed by monitoring redistribution of mobile ions.

The size of a piezoionic sensor can vary in different embodiments. Due to the detection mechanism, a piezoionic layer in the sensor can be relatively thin and still generate a detectable signal. For comparison, a piezoelectric sensor for example relies on stress induced local di-polar charges for generating the signal to be detected. As the overall voltage signal generated by di-polar charges in the sensing material is proportional to the thickness of the material in the direction of measurement, the thicker the material the higher the signal. A minimum thickness is thus required for the piezoelectric sensor to provide a detectable signal that can be conveniently analyzed. In contrast, the signal generated by local redistribution of mobile ions in a piezoionic layer is dependent on the local charge redistribution (see Equation (1) above), and a thinner piezoionic layer can still provide a detectable voltage. An embodiment of a sensor disclosed herein may have a simple structure, and may be relatively easy and inexpensive to manufacture. Piezoionic hydrogels may be used in the sensor. Some hydrogel materials may be selected as they can provide one or more of the following:

high ionic conductivity, highly compliant, transparent (with transparency higher than 95% or 98%), high conformability (e.g. can conform to various complicated surface structures), and high mechanical strength (toughness).

Embodiments of the sensors disclosed herein can be constructed from materials that are robust, highly flexible and deformable.

As can be appreciated, the touch sensors described herein may be used in touchscreens and other applications where touch sensing is needed. For example, a touch sensor disclosed herein may be used in an electronic device, such as a display or input device, or a wearable or implantable electronic device. Selected sensors may be convenient to use for medical or healthcare applications. It should also be understood that touch is not limited to touch by a human finger, and can be made by contact of any two physical objects. For example, touch can be made by a pen, a screw, a foot, a wheel, a stylus, a small probe such as an atomic force microscope tip, features on a surface such as fingerprints, or the like.

Embodiments of pressure sensors disclosed herein may also find applications in other areas such as being used as floor sensors under the surface of a floor to detect movements across the floor. They may be placed on walls, door handles, in clothing or on the surface of the skin for example, to detect touch or other forces.

A possible medical application of a piezoionic sensor disclosed herein is to use the sensor as part of a layer that conforms to a human body such as in an artificial skin. For example, artificial skin patches may be used to detect force, temperature, skin conductance, and other physiological parameters. Thin film transistor circuits or micro-fabricated electronics may be integrated in a thin adhesive film, which can be attached to a robotic or human body. A piezoionic sensor disclosed herein may be imbedded in such thin film or skin patches to provide further flexibility, compliance, biocompatibility, and tune-ability of materials, to accommodate different body parts (even in vivo), possible integration with a therapeutic system such as drug pumping. Potential physiological parameters that may be detected or measured with a piezoionic sensor based smart patch include: cardio-seismography derived heart rate, electrocardiogram, blood pressure, respiratory rate based on chest movements, respiration depth, tidal volume, oxygen saturation, electroencephalogram, vigilance, relaxation, digestion, emotion and stress level, or the like.

For example, a piezoionic sensor may be provided in a wearable stethoscope. Patients may discretely attach such sensor patches on their chests such that the piezoionic sensor in the patch can transduce acoustic and seismographic profiles continuously, enabling diagnosis of certain medical conditions, such as various heart conditions including mitral regurgitation, aortic regurgitation, arrhythmia, and etc. The wearable patch may contain an RF (radio frequency) transmitter so that signals can be wirelessly transmitted to a separate computer for processing. A piezoionic sensor disclosed herein may be able to detect signals with a dynamic frequency range suitable for both the bell-mode (low frequency: breathing sounds) operation and the diaphragm-mode (high frequency: heart murmurs, blood perfusion) operation of a typical stethoscope.

Conveniently, in some embodiments a sensor disclosed herein does not require electrodes disposed within a sensing contact area such as on a sensing pad. It may be sufficient if the electrodes are in contact with an edge of the contact area or sensing pad.

As a sensor disclosed herein may be sensitive to different pressures, such a sensor may be used in applications where vibration over a larger surface needs to be monitored.

While many piezoionic materials are suitable for making transparent sensors, some applications do not require a transparent sensor, or do not require that the sensor be entirely transparent or highly transparent. In some applications it may even be desirable that the sensor is not transparent. In such applications, a piezoionic sensor as disclosed herein may be non-transparent, partially non-transparent, or have a relatively low transparency. In such a case, other non-transparent components such as non-transparent electrodes may be used in the sensor.

In some embodiments, a sensor disclosed herein may be relatively easy and inexpensive to fabricate, with low cost raw materials and simple electrical or electronic components or circuits.

While it has been discussed that a piezoionic sensor as described herein may be used for touch sensing without the application of an external electric, magnetic, or electromagnetic signal, such as a voltage, to the sensor to drive the separation of the mobile ions, it should be noted that an external signal may be applied in some embodiments such as to enhance measurement performance or for another purpose. When an external electrical signal is applied to a piezoionic sensor, an electrical response due to redistribution of mobile ions caused by pressure can still be produced, which can be combined with any response resulted or related to the applied signal. For example, if a current is applied, the piezoionic material may act as a piezoresistive sensor, as known to those skilled in the art. In some cases the piezoionic material may be modified by the application of an external signal, for example when the external signal leads to variations in concentrations of mobile ions or other charges across the sample.

For example, in some cases, an embodiment of a sensor described herein may be operated with an applied voltage or current. Such cases may include a case where an ionic conductor in a piezoionic sensor is also used for an additional purpose to perform an additional function. For example the ionic conductor may be used to carry an alternating current (AC) or direct current (DC), to form a part of a battery or supercapacitor, to form a part of a strain gauge sensor, to form a part of an electrochemical solar cell or in a different electrochemical device, or to form a component in other like devices. In some embodiments where the two metal electrodes are used with the piezoionic sensing material, a voltage offset may result from an electrochemical potential difference between the two electrodes that arises from a difference in the metals used on the respective electrodes, or from a difference in the concentrations of reactive ions adjacent to the respective electrodes. In a case where a DC voltage offset from zero is applied to the sensor material, if the DC voltage is small and represents an open circuit, then the sensor response can be superimposed on the DC offset, producing a transient current in the case of a fixed voltage being applied, or a voltage change in open circuit conditions. In the case of a steady current being applied to the sensor material, this can result in electrochemical reactions at the electrodes, leading to a change in ion concentrations. In this case, although a signal representing a superposition of the current input and the sensor response can be detected, the sensor response can be altered due to changes in ion concentrations near the electrodes. An applied AC signal can also be superimposed on the sensor signal. It may also be expected that passage of an AC current through the sensor material can heat the sensor material, leading to a faster response. When the sensor is deformed, in addition to the piezoionic response, the resistance in the sensor material can also be changed.

When a current is being applied to the sensor, the voltage drop or the current, or both, can change as the material resistance is altered by the deformation of the sensor. These two sensor signals can be decoupled to enable two sensing modalities to be employed. For example, the application of a sinusoidal current at high frequencies (>1 kHz for example), as compared to the frequency components of the applied force, may allow the change in resistance to be monitored by extracting the component of the voltage response at that frequency, while the change in voltage due to the piezoionic response can also be monitored.

In different embodiments, various current, voltage or other electrical signals, or combinations thereof, may be applied to a piezoionic sensor during use or operation.

Other features, modifications, and applications of the embodiments described here may be understood by those skilled in the art in view of the disclosure herein.

The following examples are provided to further illustrate embodiments of the present invention, and are not intended to limit the scope of the disclosure.

EXAMPLES

Example I Sample Piezoionic Hydrogels

A sample piezoionic material was prepared. The sample material was prepared from a hydrogel material formed of a polyurethane, which had an electrically neutral backbone. The hydrogel samples were soaked in solutions of different alkali salts respectively. The alkali salts used were LiCl, NaCl, KCl, and $NaPF_6$. The sample piezoionic materials were highly transparent and stretchable.

The piezoionic sensor samples were prepared as follows. 2 g of a water soluble urethane polymer (HydroMed™ D640, available from AdvanSource Polymer, USA) was mixed with 1 ml of deionized water and 17 ml of ethanol to form a mixture. A highly viscous precursor was formed after stirring the mixture constantly over a period of 24 hours. The precursor was poured into a mold formed of a glass Petri dish. The mold was sealed with perforated PARAFILM™ to enable slow evaporation of ethanol. The sample materials dried completely after 48 hours, and were readily removed from the mold. Subsequently, the dried sample material, a dry hydrogel film, was immersed in deionized water for 20 to 30 minutes. It was expected that the hydrophilic carboxyl and hydroxyl functional groups in the material facilitated water absorption, which lead to a considerable volume and weight increase. The swollen hydrogel films were placed in different aqueous solutions of sodium chloride, potassium chloride, or sodium hexafluorophosphate at different concentrations from about 0.1 M to 3 M for at least 24 hours.

Measurements of the sample products showed that the Young's Modulus of the prepared sample hydrogels was 0.3 MPa. It is expected that the sample hydrogels would typically have about 100% linear expansion, 90 v % water content and 2 to 300% swelling ratio. It is expected that these sample materials are suitable for use as reservoir of ions and as flexible substrates.

Example II Tests of Sample Sensors' Response to Touch

Sample piezoionic sensor materials prepared in Example I were tested for touch response.

Figure 17:
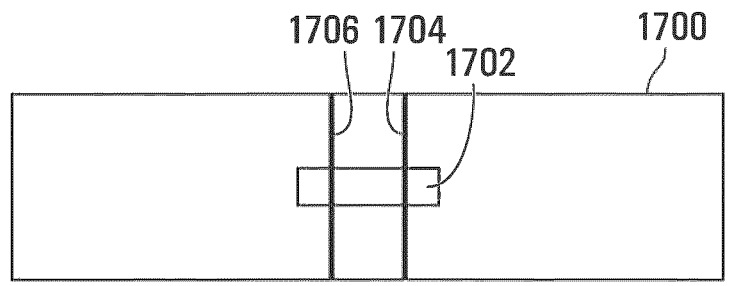
FIG. 17 is a schematic top view of a test set for testing a sample piezoionic touch sensor.

A Bose ElectroForce™ 3100 muscle analyzer was used to apply controlled pressure on the samples. For some of the tests, each sample hydrogel film was placed on a microscopic glass slide with two electrodes placed 1 cm apart underneath. The electrodes were connected to an AutoLab™ Potentiostat/Galvanostat. The test setup is schematically shown in FIG. 17, where a glass slide 1700 supported the sample sensor material 1702 to be tested and the electrodes 1704 and 1706 placed between glass slide 1700 and sensor material 1702. Electrode 1704 was used as a working electrode and electrode 1706 was used as a counter electrode. The electrodes 1704 and 1706 were made of 250 μm metal wires.

Figure 18:
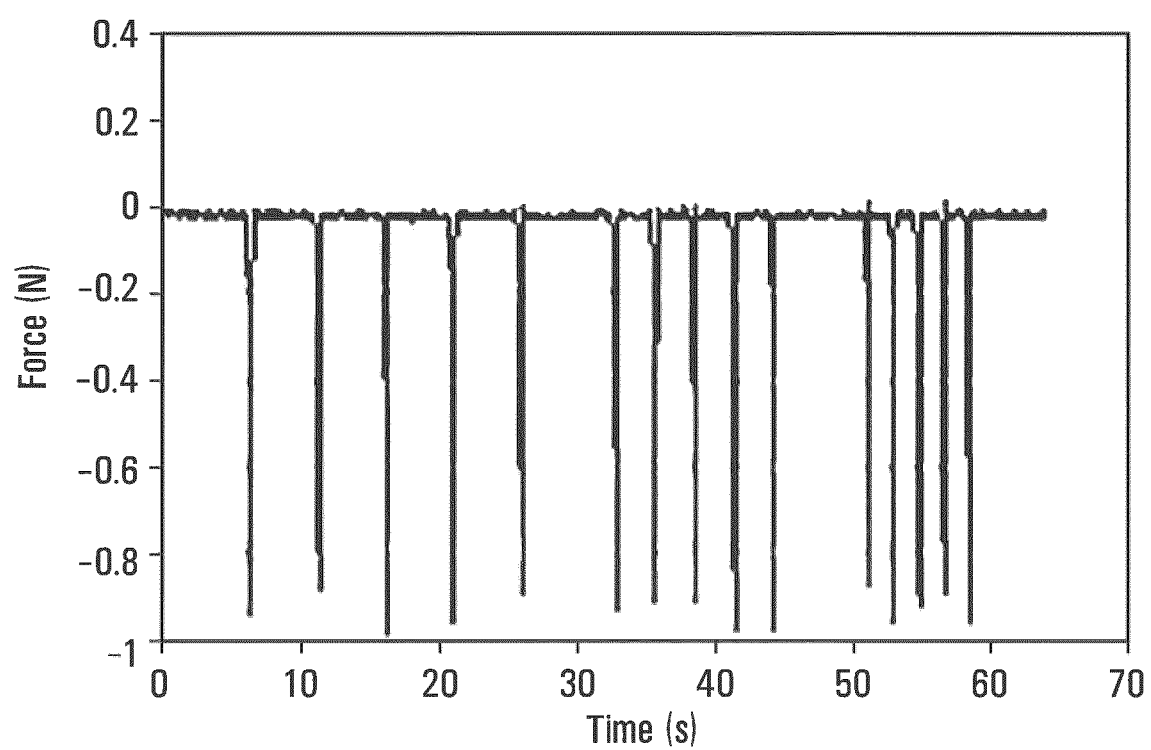
FIG. 18 is a line graph showing representative test data.

The sample hydrogel sensor was pressed on by a plastic cylinder of 5 mm diameter attached to a linear actuator. For each tapping, the film was pressed with a pressure of 30 KPa for less than 100 ms, and the electrical response lasted about 200 ms. A representative pressure cycle is illustrated in FIG. 18.

Figure 19:
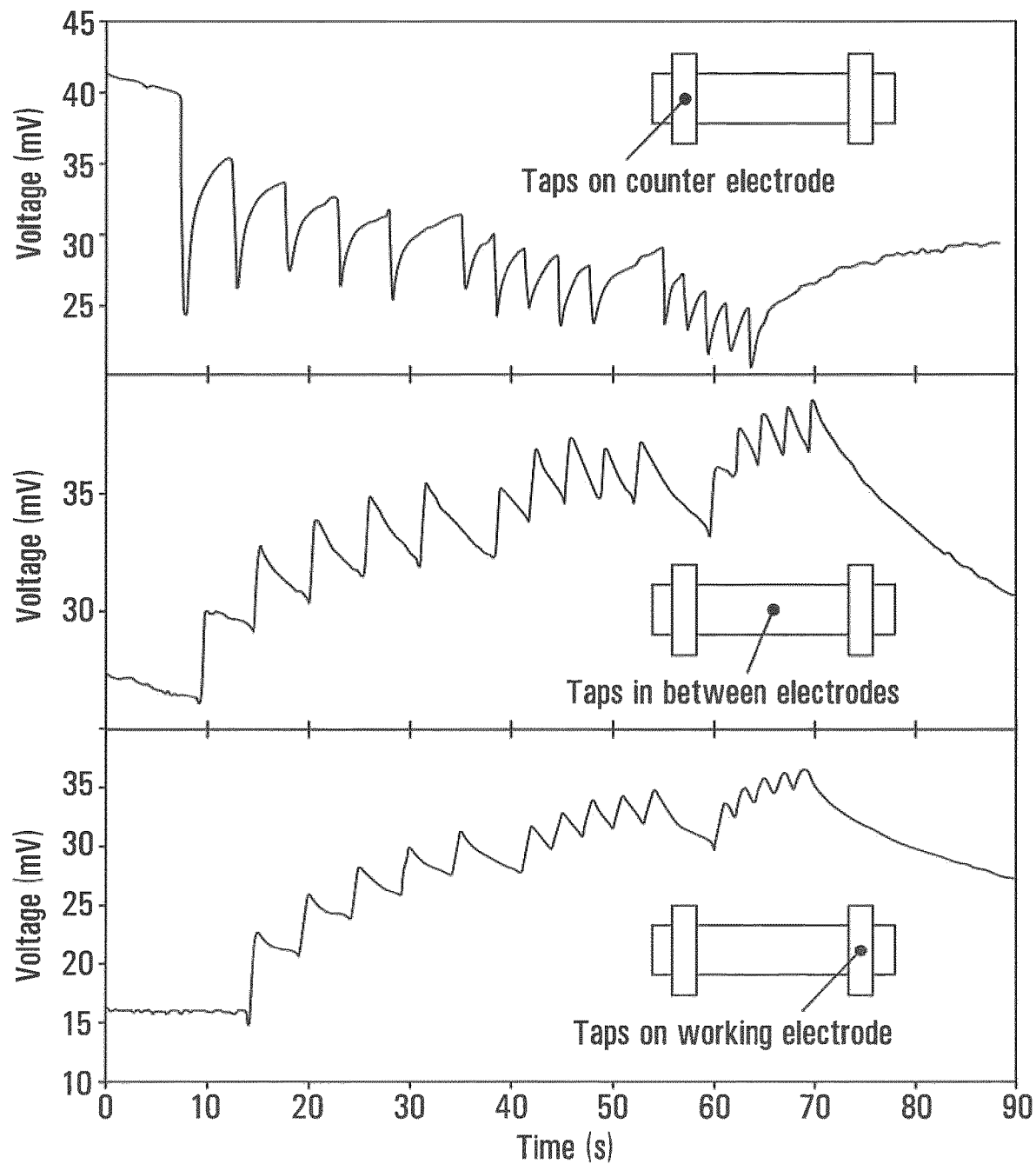
FIG. 19 is a data graph showing representative voltage responses of a sample sensor.

FIG. 19 shows representative voltage signals generated by taps on a sample hydrogel film with dimensions of about 8 mm by 3 cm by 200 μm. The sample used in this test was soaked with a solution of 0.1 M KCl as the electrolyte. The three diagrams in FIG. 19 show results of a tap on the counter electrode (top), between the electrodes (middle), or on the working electrode (bottom) of the Galvanostat.

The open circuit voltage at the rest state was presented as observed without normalizing. The instantaneous response was fast (about 20 ms) where the open circuit potential increased or decreased depending on the location of the tap as seen in FIG. 19. The voltage then returned slowly to equilibrium.

It was also observed that when the force was applied in the center between the electrodes, there was a net cancelling of the piezoionic effect and thus a much smaller voltage response was observed (see the middle diagram in FIG. 19).

Figure 20:
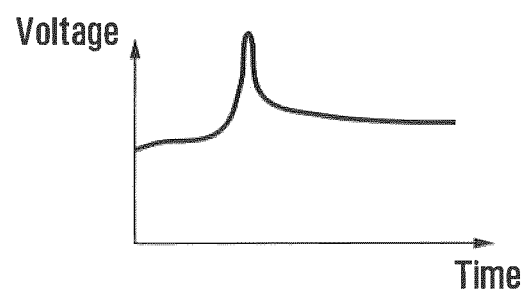
FIGS. 20 and 21 are line graphs showing expected voltage responses of different sample sensor materials.

It was observed that in response to a tap on the sensor top surface, the voltage between the two electrodes exhibited a rise, a fast drop, and then a slow decay, for sample sensors formed of polyurethane containing an alkali chloride. FIG. 20 shows a representative voltage response of this sample sensor, which was expected to contain two types of mobile ions that could be displaced and redistributed by a touch.

Figure 21:
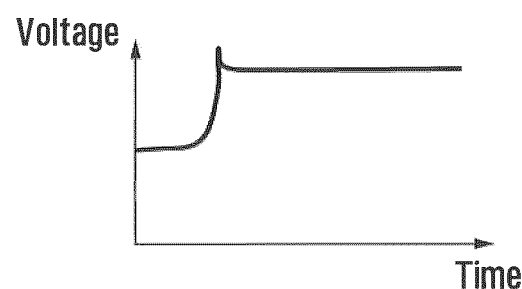

In comparison, FIG. 21 shows a representative voltage response to a tap on a piezoionic touch sensor formed of a material (e.g. a cationic membrane) that was expected to contain one type of mobile ion displaced and redistributed by the tap. As can be seen in FIG. 21, with this type of materials the voltage exhibited a rise and then a slow decay as long as the pressing force was continuously applied.

In either case, the voltage output was proportional to the applied force, and was on the order of about 10 mV per MPa. Touching pressures (a light tap) as small as a few tens of kPa were found still resolvable.

Transient current and voltage responses were observed even when the touching pressure was applied to a region away from each electrode. It was observed that the sign and magnitude of the voltage response were dependent on the position of the tap relative to the sensing electrodes.

FIG. 21 shows a representative voltage response to a tap between the two electrodes, and a representative voltage response to two consecutive taps applied between the two electrodes at different times. It was demonstrated that the sample touch sensor was able to detect such taps.

It can be expected that multiple touches on a two-dimensional piezoionic sensor could be also detected.

As the sign and magnitude of the voltage response depended on the location of the touch, it was expected that the touch location could be detected using only electrodes disposed at the edges of a sensor pad. However, as the displacement of ions may not extend over a long distance, this may require the electrodes be spaced close to each other.

Current response to touch on the sample sensors was also studied. Representative results are shown in FIG. 22.

Similar to the voltage response, the direction of the current response was dependent on the direction of the pressure gradient applied relative to the electrodes. One significant difference with the current response compared to the voltage response was the faster relaxation time after a tap. This was expected to be due to the reason that only physically imposed displacement of the mobile ions could give rise to a current sufficiently large to be detectable by the interface electronics used, and smaller/slower motion of mobile ions (while reaching equilibrium) could not provide a signal with a large enough magnitude to be detected.

It was observed that current response tends to have less base line drift and noise in comparison with the voltage response, in addition to faster relaxation time after a tap.

Figure 22:
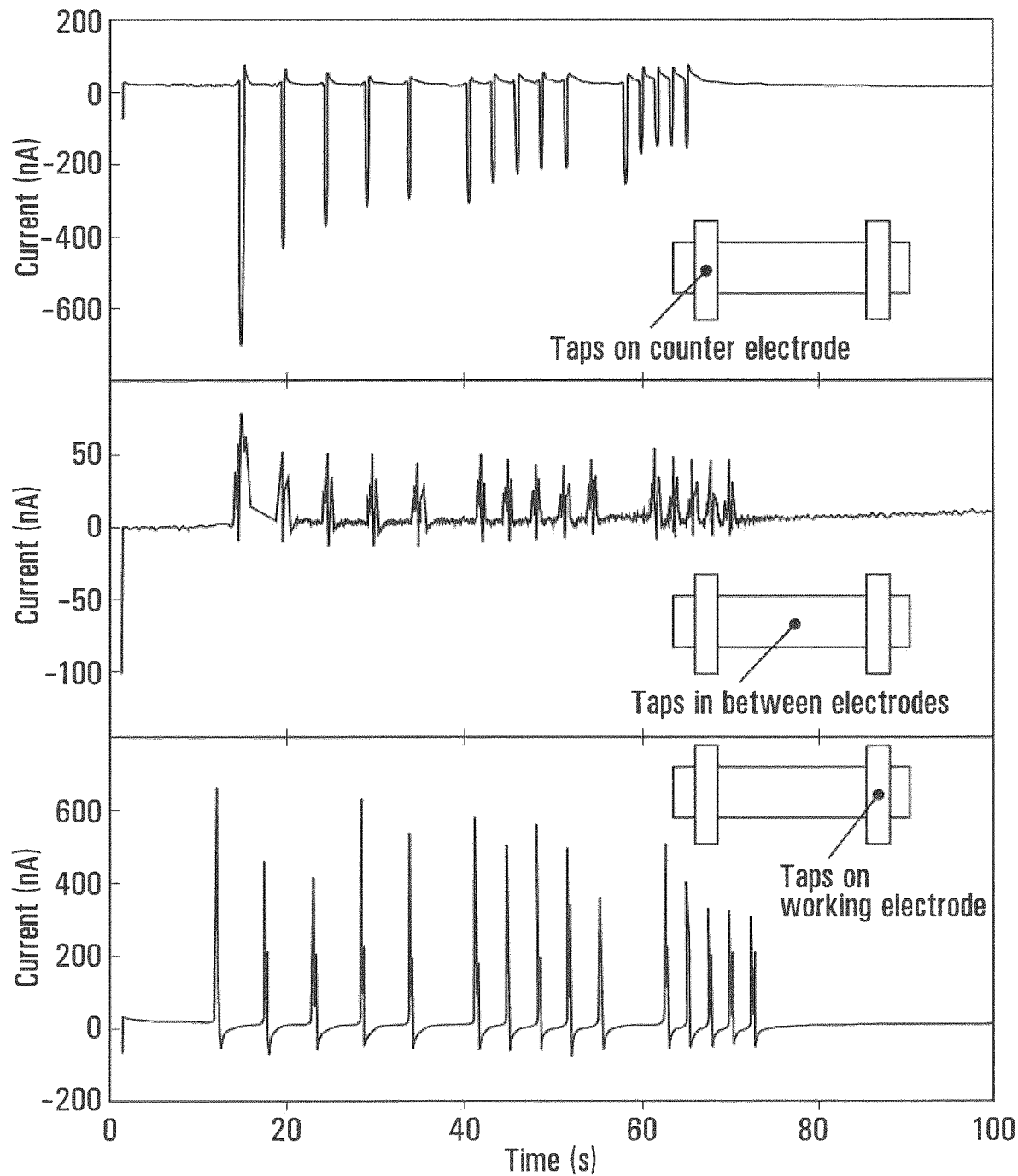
FIG. 22 is a data graph showing representative current responses of a sample sensor.

Both open circuit voltage response and short circuit current responses to a series of taps at varying frequencies, as illustrated in FIG. 19 and FIG. 22 show a decrease in amplitude of the response with an increase in the frequency of taps. Such characteristic is possibly due to (i) mechanical relaxation and recoil time of the polymer matrix, or (ii) delayed recombination of cations and anions.

Figure 23:
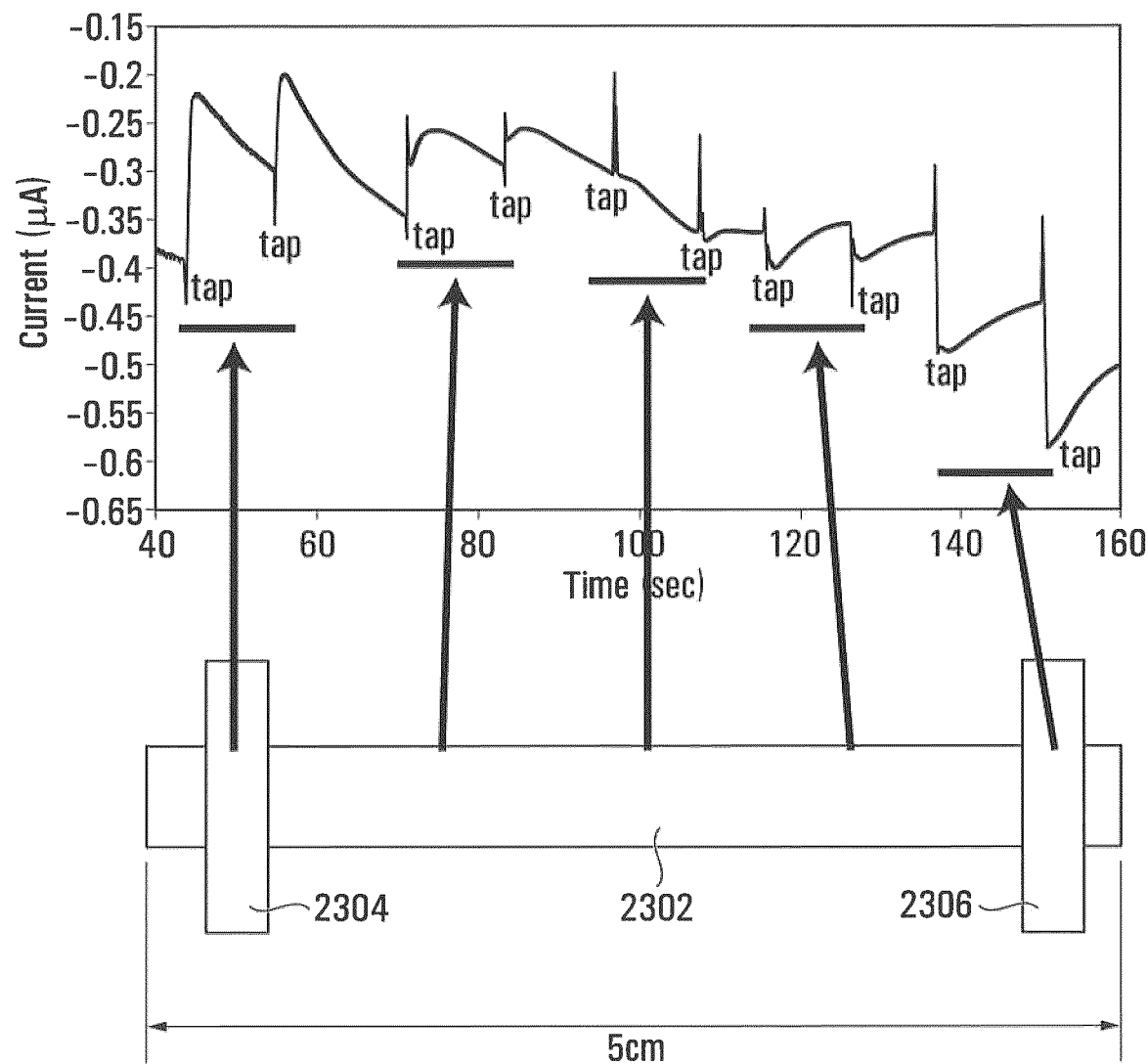
FIG. 23 is a data graph showing representative current responses of a sample sensor.

Further tests were performed to examine the response of the sample sensors to stimuli applied at a region between the electrodes. Representative results are shown in FIG. 23, where the tap locations are also indicated schematically with reference to the sensor which was formed of a sensor strip 2302, a working electrode 2304 and a counter electrode 2306. The electrodes used for these tests were 8 mm wide copper strips and were placed 5 cm apart from each other. The sample sensor used was a strip of a sample hydrogel prepared in Example I with 1.0 M $NaPF_6$ as the electrolyte. The strip had a thickness of about 200 μm. It was found that a wider surface area of the electrodes resulted in a larger drift in the signal as compared to the thinner (250 μm wires). The mechanical signals were low pressure human finger taps. It was observed that there was a gradual change in direction and amplitude of the current generated with taps initiating exactly on the working electrode, then along the length of the sample sensor to the end with the counter electrode. The response went from negative on the working electrode to positive on the counter electrode with varying directions in the region between them. The amplitude diminished as the taps moved away from either of the electrodes and was the minimum for taps in the middle of the sensor strip.

In summary, the test results show that when sample sensors were compressed over an area approximately the diameter of a fingertip under a pressure of 30 kPa above an electrode, the measured voltages and currents between the electrode and another electrode about 1 cm away were on the order of $10^{-2}$ V and $10^{-7}$ A, relative to a second electrode that is approximately 1 cm away. The sign of the detected voltage and current signals was dependent on relative proximity of the tap to each electrode, and the magnitude of the signals appeared to drop with increasing distance from the tap region.

The test results suggest that it may be possible to discriminate the location of touch based on signals transmitted to the edges of a piezoionic touch sensor.

Example III Piezoionic Polymer with Gel Electrolyte

A sample dry solid state sensor was prepared. The sample materials included a host polymer, poly(vinylidene fluoride-hexafluoropropylene), and an ionic liquid, 1-Ethyl-3-methylimidazolium bis(trifluoromethylsulfonyl)imide. The sample sensors were configured as illustrated in FIG. 1. The electrodes were made of copper, and had a size of 0.5 cm by 1 cm and a thickness on the order of a few hundred μm, and were separated by a distance of 1.5 cm. The sample sensors were also tough, flexible, and quite transparent.

The sample sensor material contained a multiphase polymer, which solvated a salt, and but did not contain any water. The sample sensors exhibited lower ionic conductivities, as compared to other piezoionic samples containing water that were also tested. However, test results showed that the sample sensors could still produce a voltage on the order of 10's of mV and generate a current of up to 1 μA.

The sample piezoionic sensors in this Example were prepared by solution casting as follows. A poly(vinylidene fluoride-hexafluoropropylene) was dissolved in acetone by sonication. The mixture was combined with 1-Ethyl-3-methylimidazolium bis(trifluoromethylsulfonyl)imide at up to 40% the weight of the polymer. Thorough mixing was achieved by further sonication for up to 30 minutes, followed by stirring with a magnetic bar for 1 to 2 hours. Desiccating was performed before curing the polymer film. When it was confirmed that there was no gas bubbles within the liquid, the mixture was poured onto a mold. To prevent the acetone from drying too rapidly, curing was done in a perforated casing at no higher than room temperature or 25° C. Once the curing was complete, the sample was peeled off the mold.

The salt used was miscible or soluble in acetone. A salt of low molecular weight with high bias in the atomic mass of the cation and the anion was expected to be convenient to use. Selected salts, 1-Butyl-3-methylimidazolium hexafluorophosphate, 1-Ethyl-3-methylimidazolium trifluoromethanesulfonate, and sodium trifluoromethanesulfonate, were used to prepare different samples. Test results showed that regardless of the salt used, all tested samples gave similar voltage and current responses.

Example IV Frequency Response Characterization of Piezoionic Sensors

Sample piezoionic materials containing gelelectrolytes based on PVDF-HFP copolymer were synthesized, which contained a pre-selected salt using a solution cast technique. PVDF-HFP copolymer pellets were purchased from Sigma Aldrich (product number 427187) and used as received. A polymer stock solution was made by dissolving PVDF-HFP in acetone at a ratio of 0.25 g/mL. Subsequently, bis(trifluoromethane)sulfonimide lithium salt (LiTFSI, Aldrich, 205281) was dissolved in propylene carbonate (Aldrich, 310318) at 0.1 M. The electrolyte was then mixed with the host polymer solution at a volume ratio of 1:2 (electrolyte/polymer stock). To ensure complete mixing, the mixture was sonicated for 2 hours with occasional stirring.

The mixture was poured over a glassy carbon substrate and covered with a perforated lid to allow gradual evaporation of the acetone at room temperature. The resultant thickness of the films was approximately 200 μm. The ionic conductivity of the gel samples was found to be 0.10 S/m.

The films were then subjected to a mechanoelectrical transduction test using the Bose ElectroForce™ 3000 series with DMA (Dynamic Mechanical Analyzer) in conjunction with the Metrohm Autolab™ 100 series potentiostat/galvanostat which was measuring the output voltage. The overall setup is depicted in FIG. 24.

Figure 24:
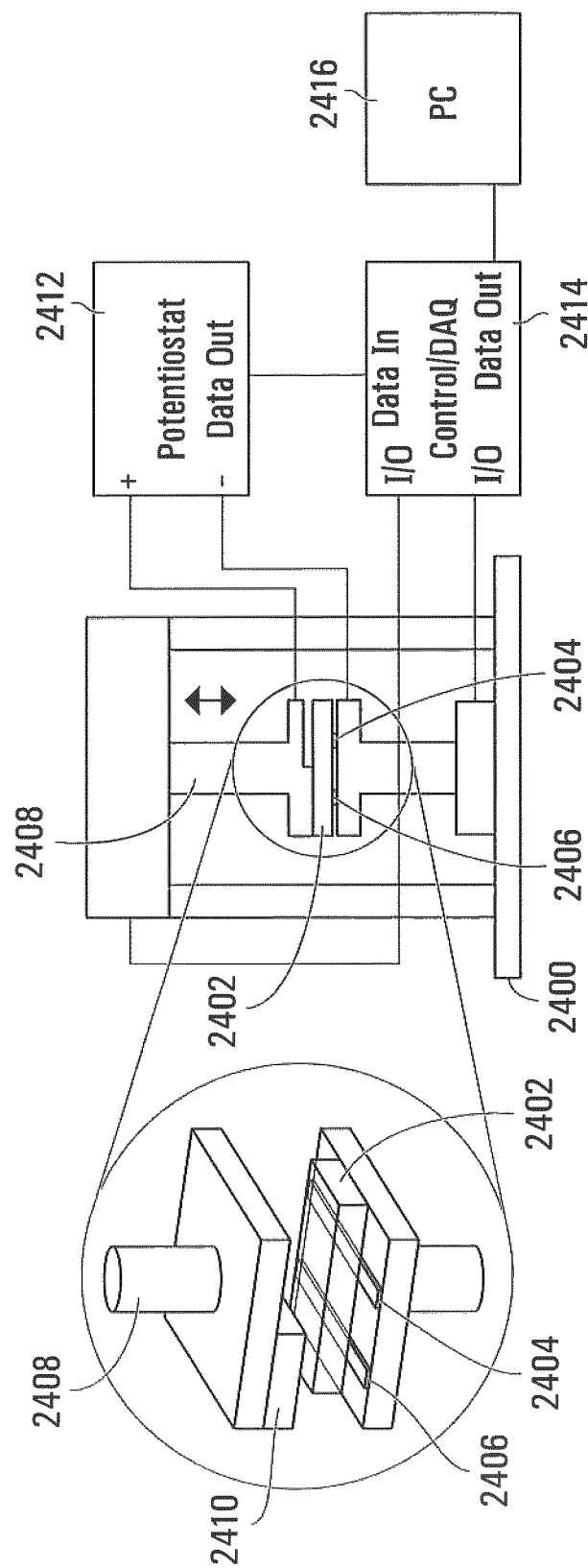
FIG. 24 is a schematic diagram of a testing setup for testing sample sensor materials.

As depicted in FIG. 24, the setup included a support and measurement apparatus 2400 for supporting the sample sensor 2402 placed over electrodes 2404 and 2406. Apparatus 2400 included a movable arm 2408 for applying a pressure through pressure pad 2410. The position and movement of arm 2408 was controlled and measured with a linear variable differential transformer (LVDT) mounted on apparatus 2400 and connected to the potentiostat 2412 and the control and data acquisition (DAQ) circuit 2414. The output of the control/DAQ circuit was connected to a computer 2416 for data analysis and recording.

A swept sinusoidal stress perturbation with amplitudes of 1-5 kPa was applied at a constant frequency of 0.1 Hz. The perturbation was load controlled and depending on the Young's modulus of the specimen, the stress amplitude was adjusted. The copper electrodes in contact (secured by Kapton tape, not shown) with the polymer samples were connected to the Autolab™ potentiostat/gavanostat system such that the voltage and current responses of the gel were captured as a function of the amplitude and the frequency of the mechanical perturbation. The Kapton tape also acted as a mask to ensure the contact area between the copper and PVDF-HFP did not vary during deformations.

Figure 25:
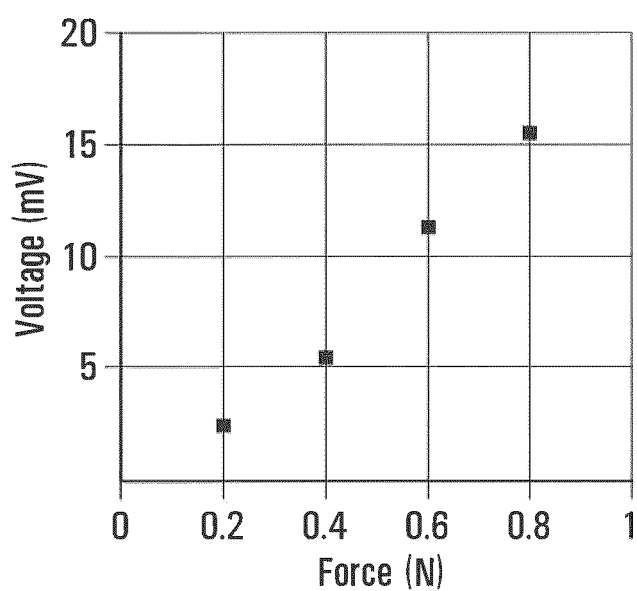
FIG. 25 is a data graph showing representative voltage responses to pressure in a sample sensor material.
Figure 26:
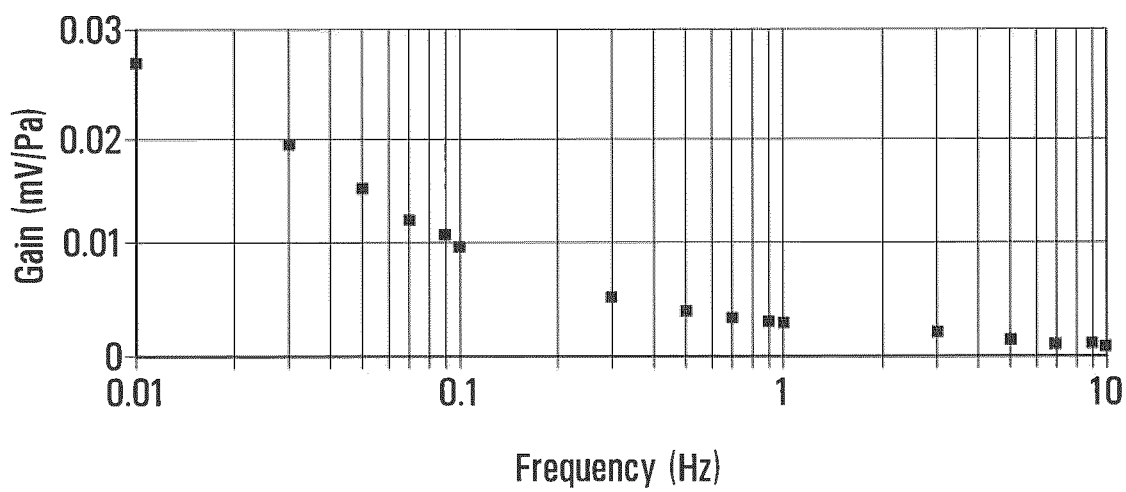
FIGS. 26, 27, 28 and 29 are data graphs showing representative frequency responses in sample sensor materials.
Figure 27:
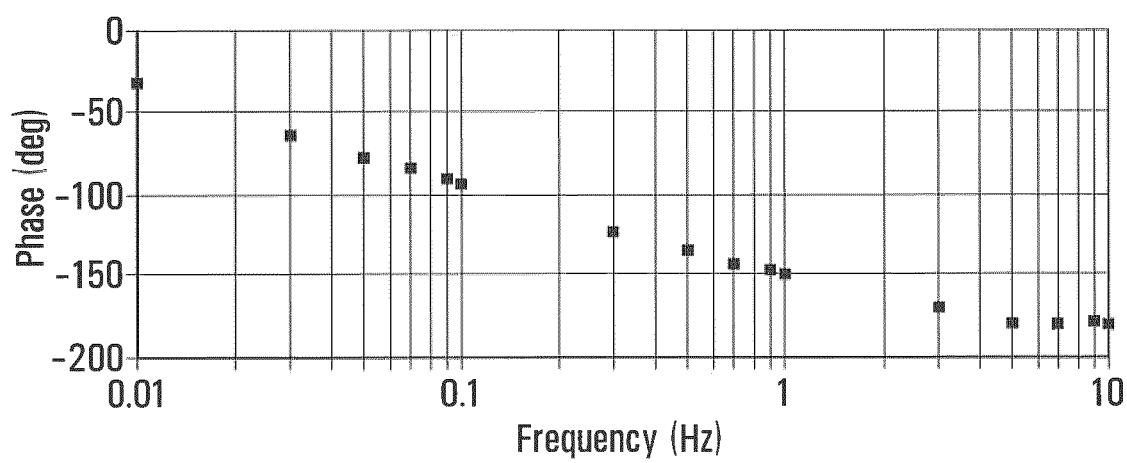
Figure 28:
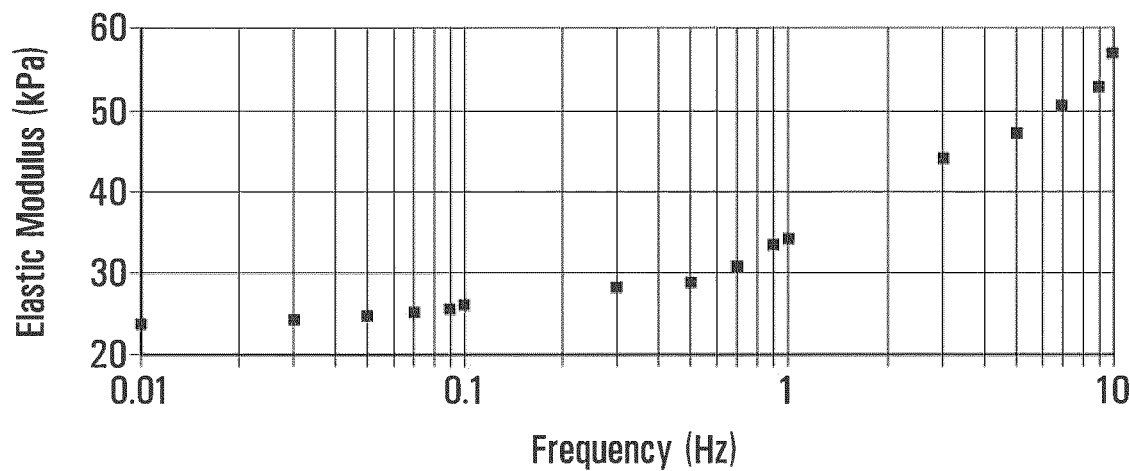
Figure 29:
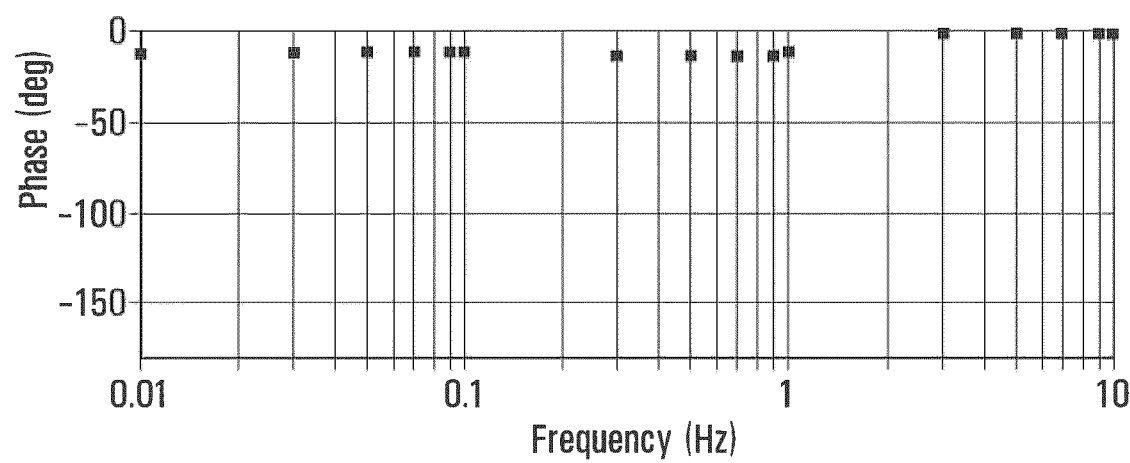
Figure 30:
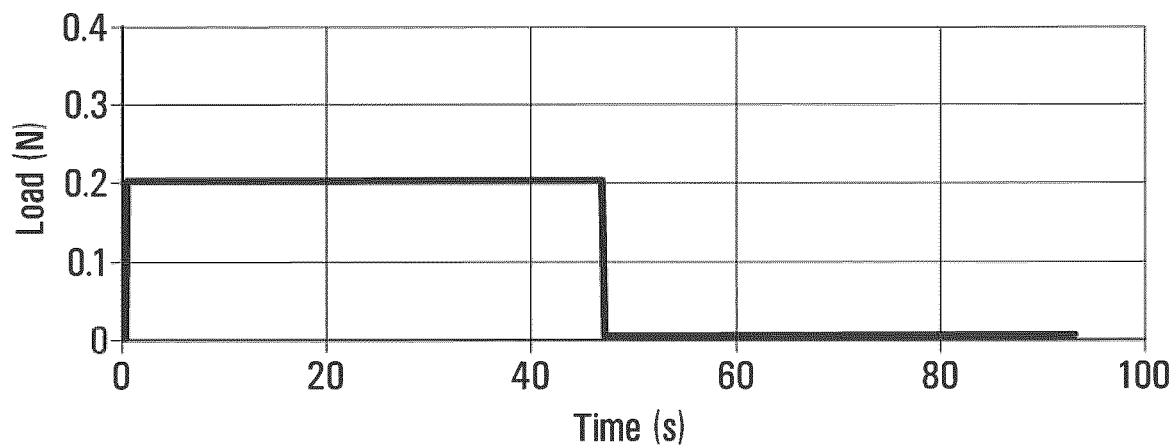
FIGS. 30, 31, 32, and 33 are line graphs showing representative signal profiles over time in sample sensor materials.
Figure 31:
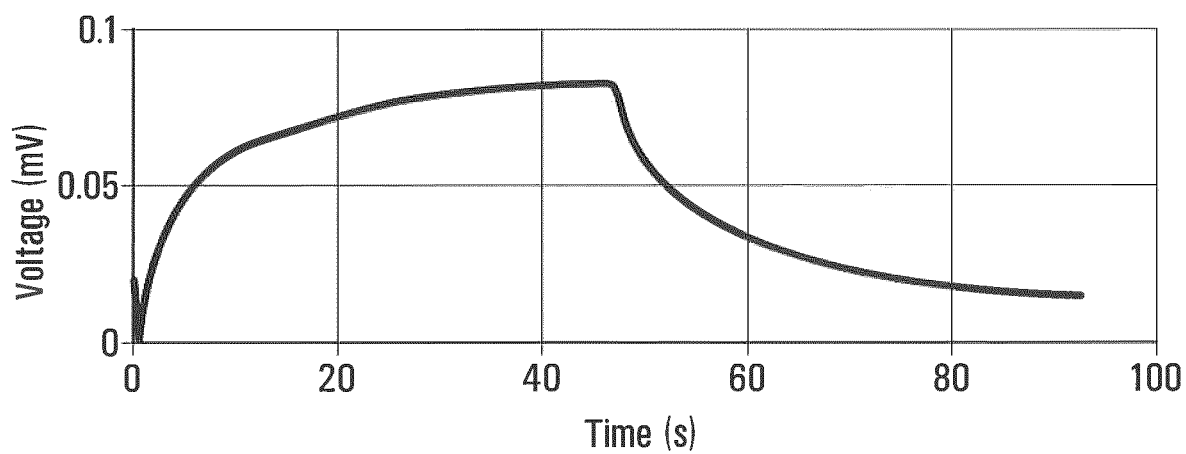

FIG. 25 shows representative data of measured amplitude response at 0.1 Hz. The data indicates that the test sensor response (detected voltage) was substantially linear with input force amplitude.

FIGS. 26 to 29 show representative resultant Bode plots of the complex tensile modulus as well as the complex 'piezoionic' transduction function of the gel sample. The sensitivity was found to be 25 µV/Pa at 10 mHz, which decayed to about 3% in amplitude by 10 Hz. The Young's modulus of the gel varied over the frequency range and was found to be mostly elastic. The cut-off frequency observed in the sample was between 0.1 and 1 Hz for both cases, suggesting that the decaying of the signal response is partially correlated to the mechanical limitations of the soft polymer sample. This correlation might be expected, as an increase in stiffness reduces the extent of deformation, and hence the generation.

For example, a reduction in deformation of the gel will reduce the induced concentration gradient and perhaps also the extent of solvent flux. The decrease in the mechanical response is only about a factor of three, whereas in sensor response it is a factor of 30, thus it does not appear to explain the entire decrease in sensor response.

Example V Step Response for Single and Double Ion Conducting Piezoionic Sensors

Figure 32:
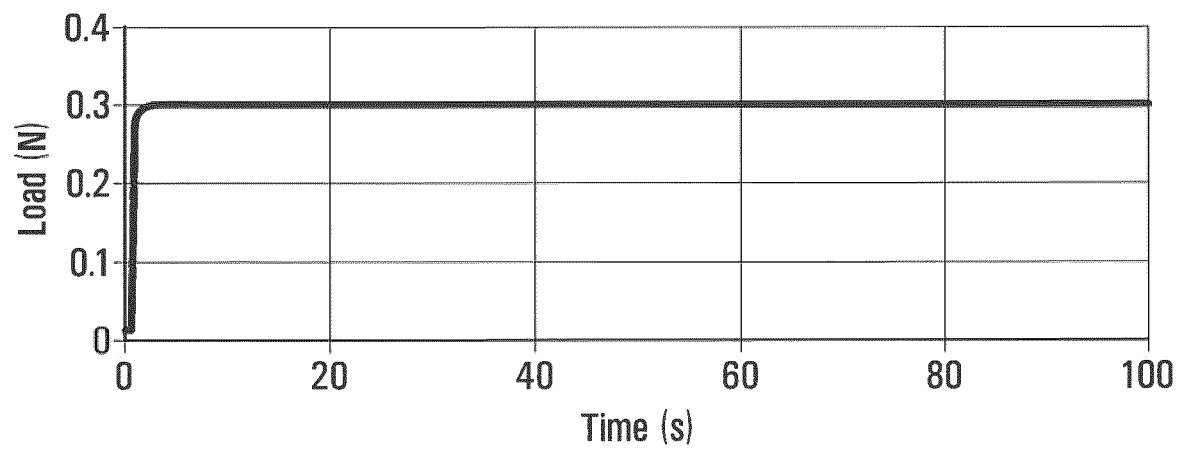
Figure 33:
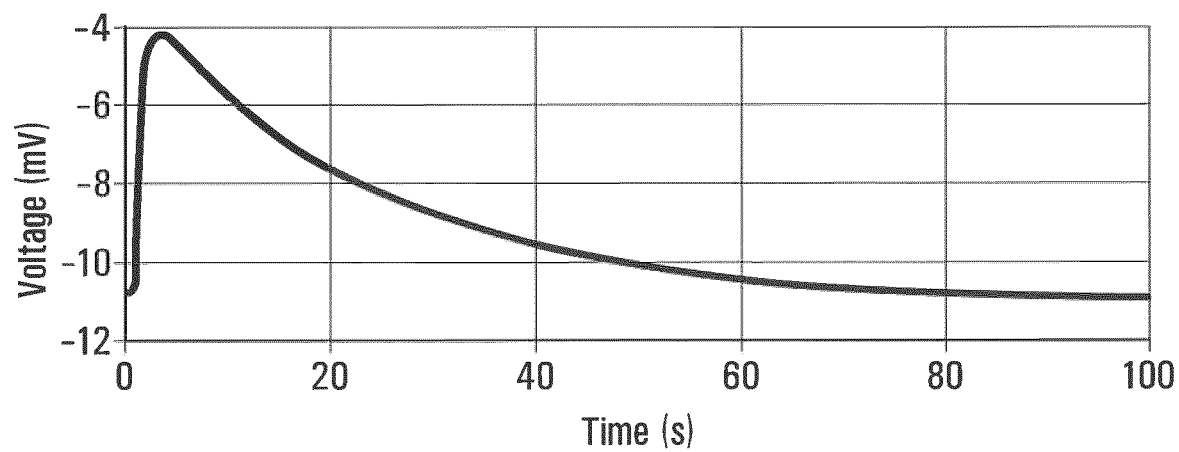

FIGS. 30 to 33 compare the step response of the sample piezoionic materials synthesized in Example IV (FIGS. 30, 31) versus a polyacrylamide hydrogel containing 2.74 M aqueous sodium chloride (FIGS. 32, 33). A resistor-capacitor (RC) charging-like response followed by a steady state voltage in the sample of Example IV was observed, whereas the observed response quickly decayed in the hydrogel sample.

The difference in the two responses provides an insight to the piezoionic mechanism as the relative ionic mobilities of the cat/anionic species can have a profound difference in the potential response profile. This is thought to be due to the ability of the counter ions to quickly re-equilibrate the charge separation if the ionic mobilities are similar (as in the sodium chloride sample). On the other hand, if one of the ionic species is hindered or immobilized due to factors such as the ion size (such as LiTFSI), polar or charged groups of the polymers or solvent properties, the charge separation persists at long times and theoretically permanently.

CONCLUDING REMARKS

It will be understood that any range of values herein is intended to specifically include any intermediate value or sub-range within the given range, and all such intermediate values and sub-ranges are individually and specifically disclosed.

It will also be understood that the word "a" or "an" is intended to mean "one or more" or "at least one", and any singular form is intended to include plurals herein.

It will be further understood that the term "comprise", including any variation thereof, is intended to be open-ended and means "include, but not limited to," unless otherwise specifically indicated to the contrary.

When a list of items is given herein with an "or" before the last item, any one of the listed items or any suitable combination of two or more of the listed items may be selected and used.

Of course, the above described embodiments of the invention are intended to be illustrative only and in no way limiting. The described embodiments of the invention are susceptible to many modifications of form, arrangement of parts, details and order of operation. The invention, rather, is intended to encompass all such modification within its scope, as defined by the claims.

What is claimed is:

1. A method of sensing a pressure applied to a surface, comprising:
   monitoring an electrical signal generated by redistribution of mobile ions in a piezoionic layer under the surface, wherein the redistribution of mobile ions in the piezoionic layer is induced by an externally applied local pressure at a portion of the layer without application of an external electrical signal to the piezoionic layer; and
   determining that the surface is pressured based on detection of the electrical signal, wherein the electrical signal is monitored through at least two electrodes in contact with one side of the piezoionic layer at different locations, the at least two electrodes being made of the same material.

2. The method of claim 1, wherein the determining comprises determining that the surface is touched at a location proximate to the portion of the piezoionic layer.

3. The method of claim 1, wherein the electrical signal generated by redistribution of mobile ions comprises a voltage or current between a first one and a second one of the locations, the first location proximate to the portion and the second location being spaced away from the first location.

4. The method of claim 1, wherein the piezoionic layer comprises a polymer.

5. The method of claim 4, wherein the polymer is a polyurethane or poly(vinylidenefluoride-hexafluoropropylene).

6. The method of claim 1, where the piezoionic layer comprises a liquid electrolyte for providing the mobile ions.

7. The method of claim 6, wherein the piezoionic layer is encapsulated to prevent leakage of the liquid electrolyte.

8. The method of claim 1, where the piezoionic layer comprises a solid electrolyte for providing the mobile ions.

9. A piezoionic sensor comprising:
a sensing surface;
a piezoionic layer disposed under the sensing surface such that an externally applied local pressure on a portion of the sensing surface causes detectable redistribution of mobile ions in the piezoionic layer without application of an external electrical signal to the piezoionic layer; and
a plurality of electrodes in contact with the layer and configured to monitor an electrical signal generated by the redistribution of mobile ions in the piezoionic layer, the plurality of electrodes being made of the same material and being in contact with one side of the piezoionic layer at different locations.

10. The sensor of claim 9, wherein the side of the piezoionic layer is opposite to the sensing surface.

11. The sensor of claim 9, wherein the plurality of electrodes are elongated and each have a thickness from 4 to 200 μm.

12. The sensor of claim 9, wherein the plurality of electrodes comprises at least one column electrode and at least one row electrode.

13. The sensor of claim 9, wherein the plurality of electrodes blocks less than 10% of the sensing surface.

14. The sensor of claim 9, comprising a processor connected to the electrodes, the processor configured to analyze the electrical signal and determine that the sensing surface is pressured based on detection of the electrical signal.

15. The sensor of claim 9, wherein the piezoionic layer comprises a piezoionic polymer.

16. The sensor of claim 15, wherein the piezoionic polymer is a polyurethane or poly(vinylidenefluoride-hexafluoropropylene).

17. The sensor of claim 9, where the piezoionic layer comprises a solid electrolyte.

18. The sensor of claim 9, where the piezoionic layer comprises a liquid electrolyte.

19. The sensor of claim 18, further comprising an encapsulation layer encapsulating the piezoionic layer.

20. The sensor of claim 9, wherein the sensor is a film.

21. A method of sensing a pressure applied to a surface, comprising:
monitoring an electrical signal generated by redistribution of mobile ions in a piezoionic layer under the surface, wherein the redistribution of mobile ions in the piezoionic layer is induced by an externally applied local pressure at a portion of the layer; and
determining that the surface is pressured based on detection of the electrical signal, wherein the electrical signal is monitored through at least two electrodes in contact with one side of the piezoionic layer at different locations, the at least two electrodes being made of the same material.

22. A piezoionic sensor comprising:
a sensing surface;
a piezoionic layer disposed under the sensing surface such that an externally applied local pressure on a portion of the sensing surface causes detectable redistribution of mobile ions in the piezoionic layer; and
a plurality of electrodes in contact with the layer and configured to monitor an electrical signal generated by the redistribution of mobile ions in the piezoionic layer, the plurality of electrodes being made of the same material and being in contact with one side of the piezoionic layer at different locations.

* * * * *